United States Patent [19]
Itoh et al.

[11] Patent Number: 5,355,981
[45] Date of Patent: Oct. 18, 1994

[54] TORQUE TRANSMISSION DEVICE

[75] Inventors: Kenichiro Itoh; Hiromi Nojiri; Kenro Adachi, all of Iwata, Japan

[73] Assignee: NTN Corporation, Osaka, Japan

[21] Appl. No.: 176,676

[22] Filed: Jan. 3, 1994

Related U.S. Application Data

[63] Continuation of Ser. No. 927,269, Sep. 17, 1992, abandoned.

[30] Foreign Application Priority Data

| Jan. 30, 1991 | [JP] | Japan | 3-009910 |
| Feb. 22, 1991 | [JP] | Japan | 3-028281 |
| Feb. 22, 1991 | [JP] | Japan | 3-028524 |
| Feb. 22, 1991 | [JP] | Japan | 3-028655 |
| Feb. 22, 1991 | [JP] | Japan | 3-028677 |

[51] Int. Cl.$^5$ .............. F16D 15/00; F16D 43/20
[52] U.S. Cl. ................................ 192/35; 192/38; 192/41 R; 192/43.2
[58] Field of Search .............. 192/35, 38, 41 R, 43, 192/43.2, 44, 45, 45.1; 180/79.1

[56] References Cited

U.S. PATENT DOCUMENTS

| 3,314,510 | 4/1967 | Zlotek | 192/45.1 |
| 4,901,831 | 2/1990 | Ito et al. | 192/38 |
| 5,016,740 | 5/1991 | Ito et al. | 192/38 |
| 5,025,902 | 6/1991 | Imai et al. | 192/43 |
| 5,131,285 | 7/1992 | Weismann et al. | 192/38 X |
| 5,135,084 | 8/1992 | Ito et al. | 192/38 |

FOREIGN PATENT DOCUMENTS

| 62-52227 | 3/1987 | Japan . |
| 1-122326 | 8/1989 | Japan . |
| 2-13882 | 1/1990 | Japan . |
| 2-113131 | 4/1990 | Japan . |
| 3-84222 | 4/1991 | Japan . |
| 1051513 | 12/1966 | United Kingdom . |
| 1247227 | 9/1971 | United Kingdom . |

*Primary Examiner*—Richard M. Lorence
*Assistant Examiner*—Andrea Pitts
*Attorney, Agent, or Firm*—Nikaido, Marmelstein, Murray & Oram

[57] ABSTRACT

A torque transmission device has an outer ring and an input shaft rotatably mounted in the outer ring. The outer ring and the input shaft are formed with engaging surfaces so as to be opposite to each other. A cage is rotatably mounted between the engaging surfaces and provided with pockets. The engaging elements are mounted in the pockets and adapted to engage the engaging surfaces when the input shaft and the cage rotate either in a normal or reverse direction relative to each other. Elastic members are mounted in the pockets to hold the engaging elements in a position where they are not engaged. A control shaft is mounted coaxially and rotatably with respect to the input shaft. The cage and the input shaft are coupled together through the control shaft so that a turning torque can be transmitted therebetween. A gap is provided in the direction of rotation at a coupling portion between the input shaft and the control shaft. A differential unit is provided to create a difference in speed between the input shaft and the control shaft.

7 Claims, 23 Drawing Sheets

TORQUE TRANSMISSION DEVICE

This application is a continuation application of Ser. No. 07/927,269, filed Sep. 17, 1992, now abandoned, which was the national stage filing of PCT/JP91/01704, filed Dec. 11, 1991.

BACKGROUND OF THE INVENTION

This invention relates to a torque transmission device which is used e.g. between the drive shaft and the wheels of a vehicle to transmit and cut of the driving torque.

When a vehicle is turning a corner, the turning radius of the front wheels is greater than that of the rear wheels. Thus, if it turns a tight corner with the front and rear wheels coupled directly, since the front wheels tend to rotate faster, they will slip, developing a phenomenon as though they were being braked.

In a conventional four-wheel drive vehicle, due to such a braking phenomenon, when turning a tight corner or while travelling on an urban street, a driver had to select either two-wheel drive mode or four-wheel one by releasing or regaining the coupling between the Front and rear wheels. Such a mode changeover was troublesome for a driver.

in contrast, as shown in FIG. 12, a full-time four-wheel drive vehicle is known in which a torque transmission device A in the form of a viscous coupling is disposed between a drive shaft C branching from a transfer B of the engine and the front differential E provided on the front axle D to absorb any difference in rotation between the Front and rear wheels by utilizing the resistance of a high-viscosity fluid contained in the viscous coupling.

However with a viscous coupling in which a turning torque is transmitted with the resistance of a high-viscosity fluid, the efficiency of torque transmission is low due to losses when resistance is produced. Also, since the shear resistance is small while the difference in rotation is small, it cannot transmit a sufficiently large torque for the weight of the vehicle.

In order to transmit a larger torque, it is necessary to increase the number and area of discs for shearing the high-viscosity fluid. This makes tile drive system bulky. Further, since the shear resistance of the high-viscosity fluid is large while running at low speed, a dragging torque may be produced while turning at a low speed. Thus, the braking phenomenon while the vehicle is turning on a tight corner cannot be wiped out.

SUMMARY OF THE INVENTION

An object of the present invention is to provide a torque transmission device which changes over mechanically between the position in which the driving torque is transmitted and the position in which it is cut off, thus making it possible to efficiently transmit torque.

Another object is to provide a torque transmission device which can transmit the driving force only in one direction and absorb any difference in rotation in the opposite direction.

A further object is to provide a torque transmission device which makes it possible to provide a completely full-time four-wheel drive vehicle.

In accordance with the present invention, there is provided a torque transmission device comprising an outer ring, an input shaft rotatably mounted in the outer ring, the outer ring and the input shaft being formed with engaging surfaces so as to be opposite to each other, a cage rotatably mounted between the outer ring and the input shaft and formed with pockets, engaging elements mounted in the pockets and adapted to engage the engaging surfaces when the input shaft and the cage rotate in either direction relative to each other, elastic members mounted in the pockets to hold the engaging elements in a position where they do not engage, a control shaft rotatably mounted coaxially with respect to the input shaft, the cage and the input shaft being coupled together through the control shaft so that a turning torque can be transmitted therebetween, the control shaft being coupled with the input shaft with a gap provided in the direction of rotation, and a differential means for creating a difference in speed between the input shaft and the control shaft.

In the above-discussed arrangement, a torque reversing transmission means provided between the control shaft and the cage may be provided to transmit the rotation of the control shaft to the cage after reversing the direction of rotation.

In one arrangement, the differential means comprises a Friction generating means for generating a frictional force against one of the input shaft and the control shaft.

In another arrangement, the differential means comprises a reduction gear unit for reducing the rotation of the input shaft transmitted to the control shaft.

In a further arrangement, the differential means comprises a differential bearing provided to couple one of the control shaft and the input shaft with a stationary member, the differential bearing having a resistance to rotation which is larger than a resistance to rotation applied to a portion at which one of the control shaft and the input shaft is supported.

In a still further arrangement, the differential means comprises deceleration imparting means for imparting deceleration to one of the control shaft and the input shaft in a non-contact manner.

In the arrangement according to the present invention, an input shaft having a differential means coupled thereto and a control shaft are coupled to the drive shaft of a vehicle. When the drive shaft rotates with the axle of the non-driven wheels coupled to the outer ring, the input shaft and the control shaft rotate relative to each other until the gaps in the direction oil rotation disappear. Thus, the engaging elements are moved by the cage to their engaging operative positions.

When in this state the outer ring coupled to the non-driven wheels begins to rotate faster than the drive shaft, the outer ring will overrun the engaging elements. The engaging elements are thus subjected to a contact which tends to disengage them. Thus, they are disengaged and the driving force is not transmitted to the nor-driven wheels.

If the driven wheels slip and the vehicle speed and the revolving speed of the non-driven wheels drop, the input shaft rotates faster than the outer ring. The engaging elements will thus engage with the engaging surfaces, so that the driving force will be transmitted the non-driven wheels through the engaging elements and the outer ring.

On the other hand, when the dive shaft rotates in the opposite direction, the cage will rotate in the opposite direction, moving the engaging elements into the engaging operative positions. Namely, since the direction engagement between the engaging elements and the engaging surfaces changes according to the direction of rotation the drive shaft, the driving force can be transmitted and cut off whether the vehicle is moving forward or backward.

The same function is attainable even when the differential means is coupled to the control shaft so that the control shaft and the input shaft rotate relative to each other.

In the arrangement in which the differential means comprises a friction generating means, when the input shaft is rotated with the friction generating means coupled to the control shaft, the rotation of the control shaft is retarded with respect to the input shaft by an amount equal to the gaps provided in the direction of rotation at the coupling portion. Thus, the cage coupled to the control shaft rotates relative to the input shaft. The same result is obtainable if the friction generating means is coupled to the input shaft not to the control shaft.

In the arrangement in which the differential means comprises a reduction gear unit, by setting the gear reduction mechanism so as to decelerate the rotation of the control shaft with respect to the rotation of the input shaft, the rotation of the thus decelerated control shaft is retarded by an amount corresponding to the gaps in the direction of rotation provided at the coupling portion. The cage coupled to the control shaft thus rotates relative to the input shaft. The same function is attainable by decelerating the input shaft so as to create a difference in speed between the input shaft and the control shaft.

In the arrangement in which the differential means comprises a differential bearing, when the input shaft is rotated with a differential bearing coupled to the control shaft, the rotation of the control, shaft is retarded with respect to the input shaft by an amount corresponding to the gaps provided in the direction of rotation at the coupling portion, since it is decelerated by the rotation resistance of the differential bearing. Thus, the cage coupled to the control shaft rotates relative to the input shaft. The same function is attainable when the differential bearing is coupled to the input shaft.

In the arrangement in which the differential means comprises a deceleration imparting means, when the input shaft is rotated with the deceleration imparting means coupled to the control shaft, the rotation of the control shaft is retarded with respect to the input shaft by an amount corresponding to the gaps provided in the direction of rotation at the coupling portion, because it is decelerated by the deceleration imparting means. The same function is attainable by coupling the deceleration imparting means to the input shaft.

In the arrangement according to the present invention, when the input shaft and the control shaft are rotated either clockwise or counterclockwise, these members rotate relative to each other. Thus the engaging elements are moved by tile cage into the engaging operative positions. Thus, the rotation of the input shaft either in the normal or reverse direction can be transmitted reliably ti the outer ring.

Since the driving mode is changed over by utilizing the mechanical contact between the engaging elements and the engaging surfaces which are movable relative to each other, the driving force is transmitted only in one direction from the input shaft or the outer ring and any turning torque in the reverse direction can be cut off reliably.

In the arrangements of the present invention, the torque transmission mode is mechanically changed over with the engaging elements engaged between the input shaft and the outer ring. Thus, the torque can be transmitted efficiently and precisely between the input side and the output side.

Further, since the engaging elements are always kept in the engaging operative positions by creating a difference in the revolving speed between the input shaft and the control shaft, even a slight difference in rotation between the input side and the output side can cause the engaging elements to be put into the engaged state. Since no large relative slipping is required as in the case of a viscous coupling which utilizes a high-viscosity Fluid, the rotation mode can be changed over with good response.

Using the torque transmission device according to this invention in the drive unit of an automobile, no braking phenomenon will happen even if the four wheels are directly connected together when turning a tight corner. The drive mode can be changed over automatically between two-wheel drive and four-wheel one. This makes full-time directly connected four-wheel drive possible.

Other features and objects of the present invention will become apparent from the following description taken with reference to the accompanying drawings, in which:

DETAILED DESCRIPTION OF THE PREFERRED EMBODIMENTS

First Embodiment

Figure 1:
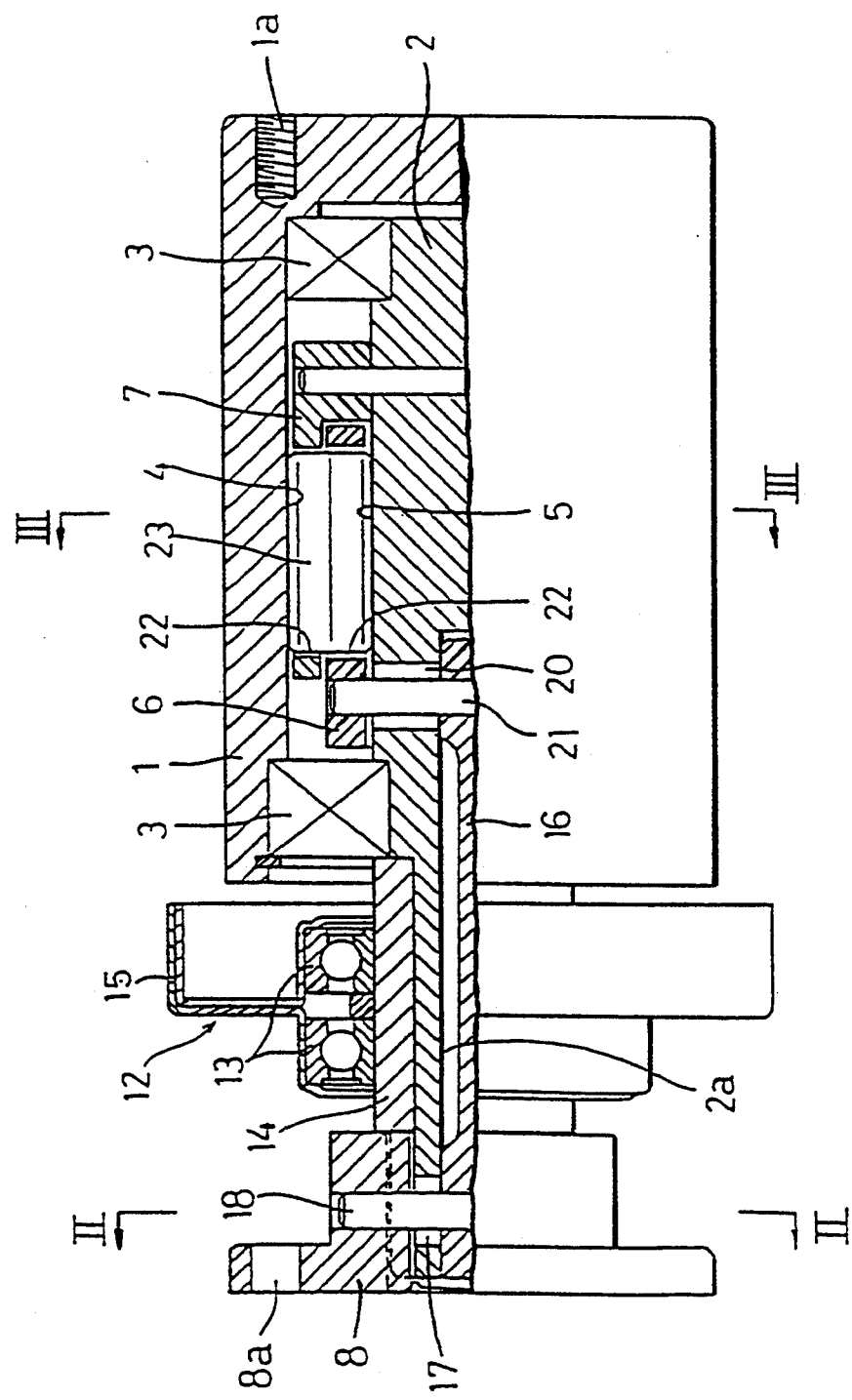
FIG. 1 is a front view partially in vertical section of a first embodiment.

FIGS. 1-5 show the first embodiment of the torque transmission device according to this invention.

An outer ring 1 and an input shaft 2 inserted in the outer ring are supported by two bearings 3 to be rotatable relative to each other.

Engaging surfaces 4 and 5 are provided opposite to each other on the inner peripheral surface of the outer ring 1 and the outer peripheral surface of the input shaft 2, respectively. Between the engaging surfaces 4 and 5, a control cage 6 and a fixed cage 7 having different diameters are mounted.

An input ring 8 coupled to the drive shaft of an automobile is mounted on one end of the input shaft 2 located outside the outer ring 1. In this embodiment, the input ring 8 is in the form of a flange having a mounting hole 8a. However, it may be a gear or the like.

Figure 2:
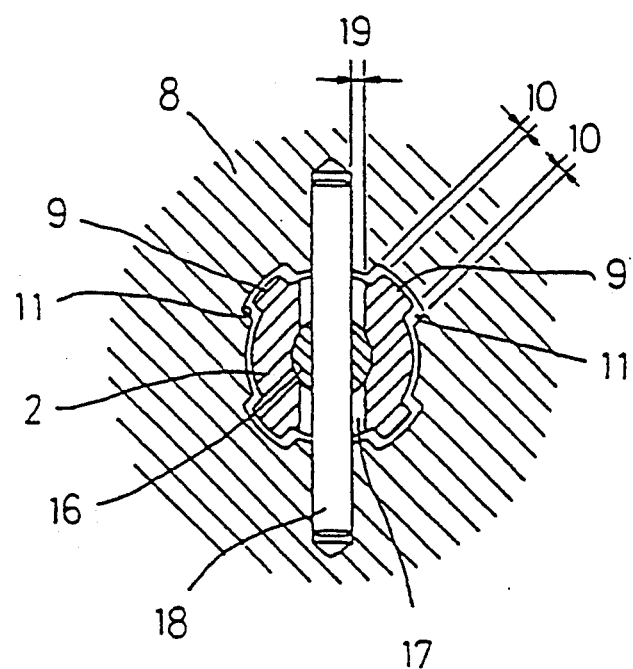
FIG. 2 is a sectional view taken along line II—II of FIG. 1.

As shown in FIG. 2, the input ring 8 is formed in the inner periphery thereof with a plurality of axial grooves 11. Axial ribs 9 provided on the outer periphery of the input shaft 2 are received in the grooves 11 with gaps 10 in the direction of rotation between the ribs 9 and the grooves 11.

A differential means 12 is coupled to the peripheral surface of the input shaft 2 between the input ring 8 and the outer ring 1. The differential means 12 comprises a resistance ring 14 tightly mounted on the input shaft 2, bearings is fitted on the outer peripheral surface of the resistance ring 14 and a Fixing am 15 for fixing the bearings 13 to a stationary member (not shown) such as a differential gear case.

The bearings 13 are Fitted on the resistance ring 14 under a pre-tension larger than the one applied ordinarily on rolling bearings. Due to this pre-tension, the rolling elements of the bearings is cannot turn freely and their response in rotation is dull. With this arrangement, the input shaft 2 is always subjected to resistance which tends to stop its rotation due to the rolling resistance of the bearings 13, so that the revolving speed of the input shaft 2 is kept lower than those of the input ring 8 and a control shaft 16 (described later) and so that any impact or inertia cannot rotate the input shaft 2 easily.

The input shaft 2 is formed in one end thereof with an axial hole 2a into which is rotatably inserted the control shaft 16. The latter has one end thereof coupled to the input ring 8 through a pin 18 inserted in a radial pin hole 17 formed in the input shaft 2. As shown in FIG. 2, a circumferential gap 19 is formed between the pin 18 and the pin hole 17, the gap 19 being larger than the above-said gaps 10 in the direction of rotation.

The control shaft 16 has the other end thereof coupled to the control cage 6 through a pin 21 inserted through a diametric pin hole 20 formed in the input shaft 21. Between the pin 21 and the pin hole 20, a circumferential gap is formed which is larger than the gaps 10 in the direction of rotation.

The control cage 6, which is coupled to the input ring 8 through the control shaft 16 and the pins 18 and 21, can rotate with the input ring 8, by an angle corresponding o the gaps 10 in the direction of rotation, with respect to the input shaft 2.

Figure 3:
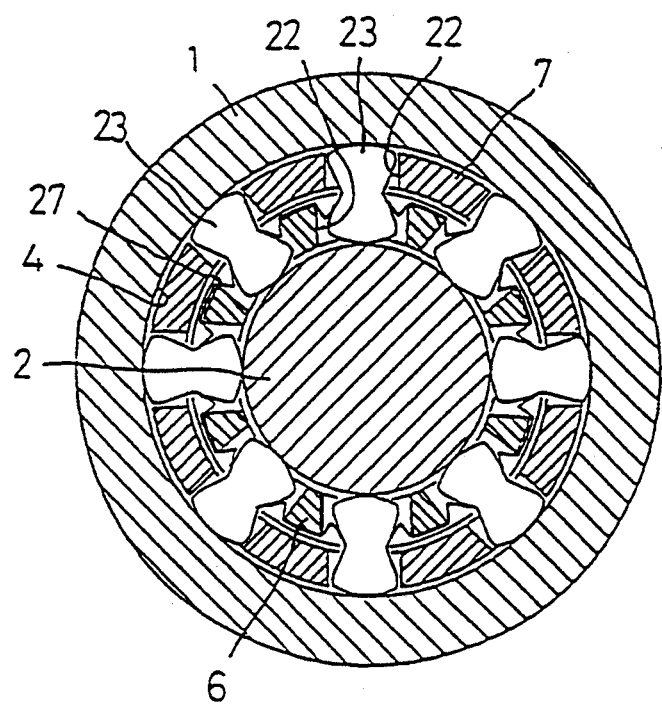
FIG. 3 is a sectional view taken along line III—III of FIG. 1.

On the other hand, as shown in FIG. 3, the control cage 6 and the cage 7 fixed to the input shaft 2 are each Formed with a plurality of pockets 22 at circumferentially equal intervals. A sprag 23 as an engaging element has both ends thereof inserted in each opposed pair of the pockets 22 formed in the cages 6 and 7.

Figure 4:
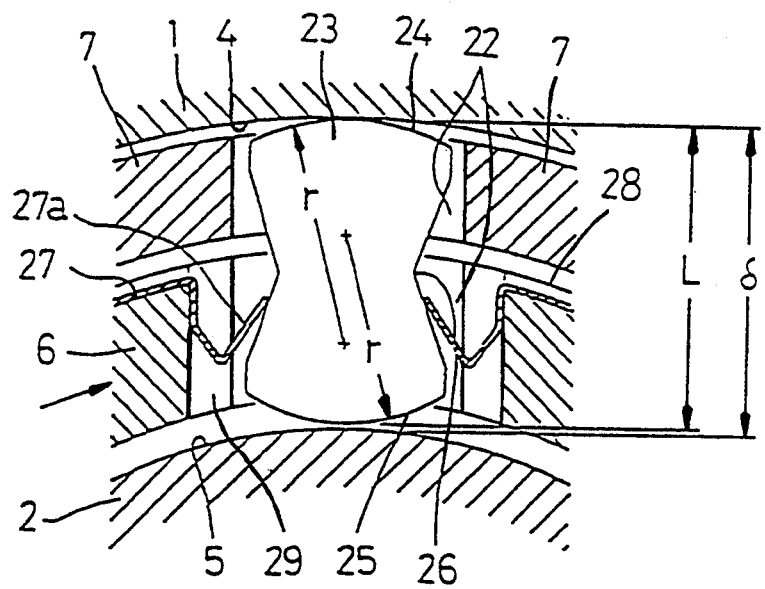
FIG. 4 is an enlarged sectional view of a portion of FIG. 3.

As shown in FIG. 4, the sprags 23 have arcuate outer and inner peripheral surfaces 24 and 25 both having a radius of curvature which is larger than half of the distance between the engaging surfaces 4 and 5.

Figure 5:
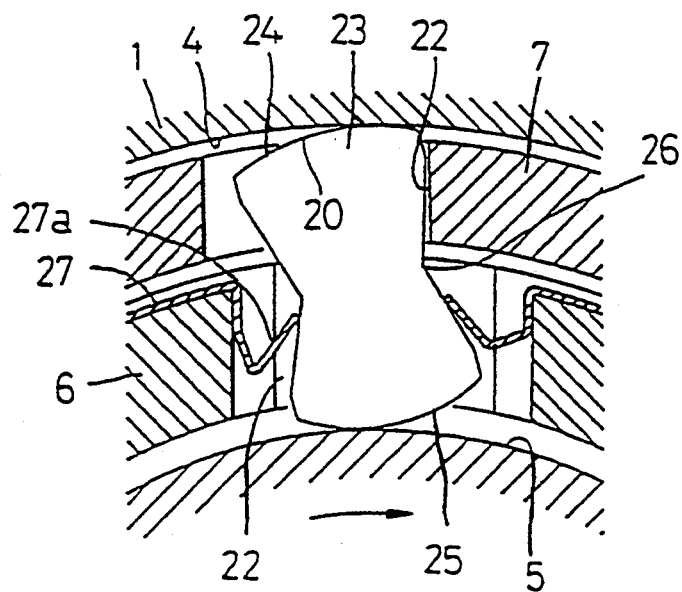
FIG. 5 is a sectional view showing how the first embodiment operates.

The distance L between the centers of the arcuate surfaces 24 and 25 is slightly shorter than the distances. Thus, when the sprags 23 incline from their neutral or upright position in either of the opposite circumferential directions with respect to the engaging surfaces 4 and 5, the outer peripheral surface 24 and the inner peripheral surface 25 will engage with the engaging surfaces 4 and 5, respectively, thus coupling the input shaft 2 and the outer ring 1 together as shown in FIG. 5.

The sprags 23 have constricted portions 26 at both sides. Elastic members 27 are supported on the control cage 6 to urge sprags 23 at the constricted portions 26 and thus hold them in the neutral position. They may be leaf springs, coil springs or the like. In this embodiment, as shown in FIGS. 3 and 4, the elastic members 27 are in the Form of leaf springs fitted in grooves 28 formed in the outer peripheral surfaces of column portions of the control cage 6 and have their bent portions 27a fitted in cutouts 29 formed in the side faces of the pockets 22 and the tips of the bent portions 27a pressed against the constricted portions 26 of the sprags 23.

Figure 12:
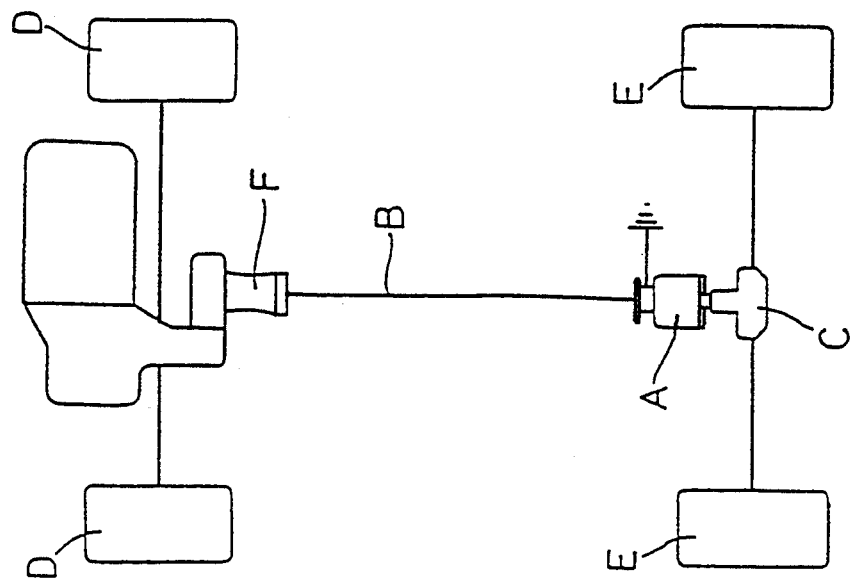
FIG. 12 is a view showing an example in which the torque transmission device is mounted on an automobile.

In mounting the torque transmission device A of this embodiment on a four-wheel drive vehicle in which the front wheels are driven, it is mounted between a drive shaft B and a rear differential C as shown in FIG. 12. In such a case, in order to prevent braking while the vehicle is travelling on a tight corner, the revolving speed of the front wheels is set higher than that of the rear wheels by setting the gear ratio of a gear coupling the transmission with the front wheel hub so that the drive shaft B will rotate at a rate about 10% lower than the front wheels.

In mounting the torque transmission device A, the input ring 8 is coupled to the end of the drive shaft B for transmission of the driving force and an input gear of the differential C is coupled to a threaded hole la formed in the end of the outer ring 1 so that the rotation of the outer ring 1 will be transmitted to the rear wheels E.

With the device mounted on an automobile, the input ring 8 is rotated by the drive shaft B. However, the input shaft 2 is kept from rotating together with the input ring 8 by the rolling resistance of the bearings 13 as the differential means 12. Thus, the input ring 8 will rotate relative to the input shaft 2 by the distance precisely equal to the size of the gaps 10 in the direction of rotation.

As the input ring 8 rotates with respect to the input shaft 2, the rotation of the input ring 8 is transmitted to the control cage 6 through the pin 18, control shaft 16 and pin 21, so that the control cage 6 will rotate with respect to the input shaft 2 and the cage 7 fixed on the input shaft 2.

With the relative rotation of the control cage 6, the sprags 23 are pushed circumferentially through the elastic members 27 and incline or pivot circumferentially. If for example the control cage 6 rotates relative to the input shaft 2 in the direction of the arrow in FIG. 4, the sprags 23 will pivot counterclockwise as shown in FIG. 5, bringing the outer arcuate peripheral surface 20 and the inner arcuate peripheral surface 25 into engagement with the engaging surface 4 of the outer ring 1 and the engaging surface 5 of the input shaft 2, respectively. In this state, the device can transmit torque in the direction of arrow in FIG. 5.

When the ribs 9 of the input shaft 2 abut the sides of the grooves 11 of the input ring 8 with the rotation of the input ring 8 so that the gaps 10 in the direction of rotation disappear, the rotation of the input ring 8 is transmitted to the input shaft 2, rotating the input shaft 2 together with the input ring 8.

If the vehicle is moving straight in this stare, the rear wheels are rotating in unison with the front wheels. Thus, the revolving speed of the rear wheel axle is higher than that of the drive shaft B, which is rotating at a lower speed than the front wheels. In this state, the outer ring 1 rotates at a higher speed than the input ring and the input shaft 2, overrunning the sprags 23. The contact with the outer ring 1 imparts the sprags 2 a turning torque in such a direction as to erect them, keeping them from wedging into between the engaging surfaces 4 and 5. Thus, the vehicle is kept in the two-wheel drive mode.

On the other hand, if the front wheels slip while the vehicle is in motion, the vehicle speed as well as the rotation of the rear wheels drop, while the revolving speed of the propeller shaft A increases. As a result, the input ring 8 and the input shaft 2 begin to rotate faster than the outer ring 1. Since in this state the sprags 23 are in a position for engagement as shown in FIG. 5, they will engage with the engaging surfaces 4 and 5 as soon as the input shaft 2 begins to rotate, so that the rotation of the input shaft 2 will be transmitted to the outer ring 1 through the sprags 23. Now the vehicle is driven in the Four-wheel drive mode in which the rear wheels are driven through the outer ring 1.

In the arrangement of this embodiment, when the input ring 8 rotates relative to the input shaft 2, the sprags 23 incline in a direction opposite to the direction of rotation of the input ring 8. Thus, the rotation of the input shaft 2, which rotates in the same direction as the input ring 8, can be reliably transmitted to the outer ring 1 without encountering slips.

No matter which direction the input ring 8 rotates, the sprags 23 will incline in a direction opposite to the direction in which the input ring 8 rotates. This means that the torque transmission device of this embodiment functions equally well when the vehicle is moving backward, too.

Second Embodiment

Figure 6:
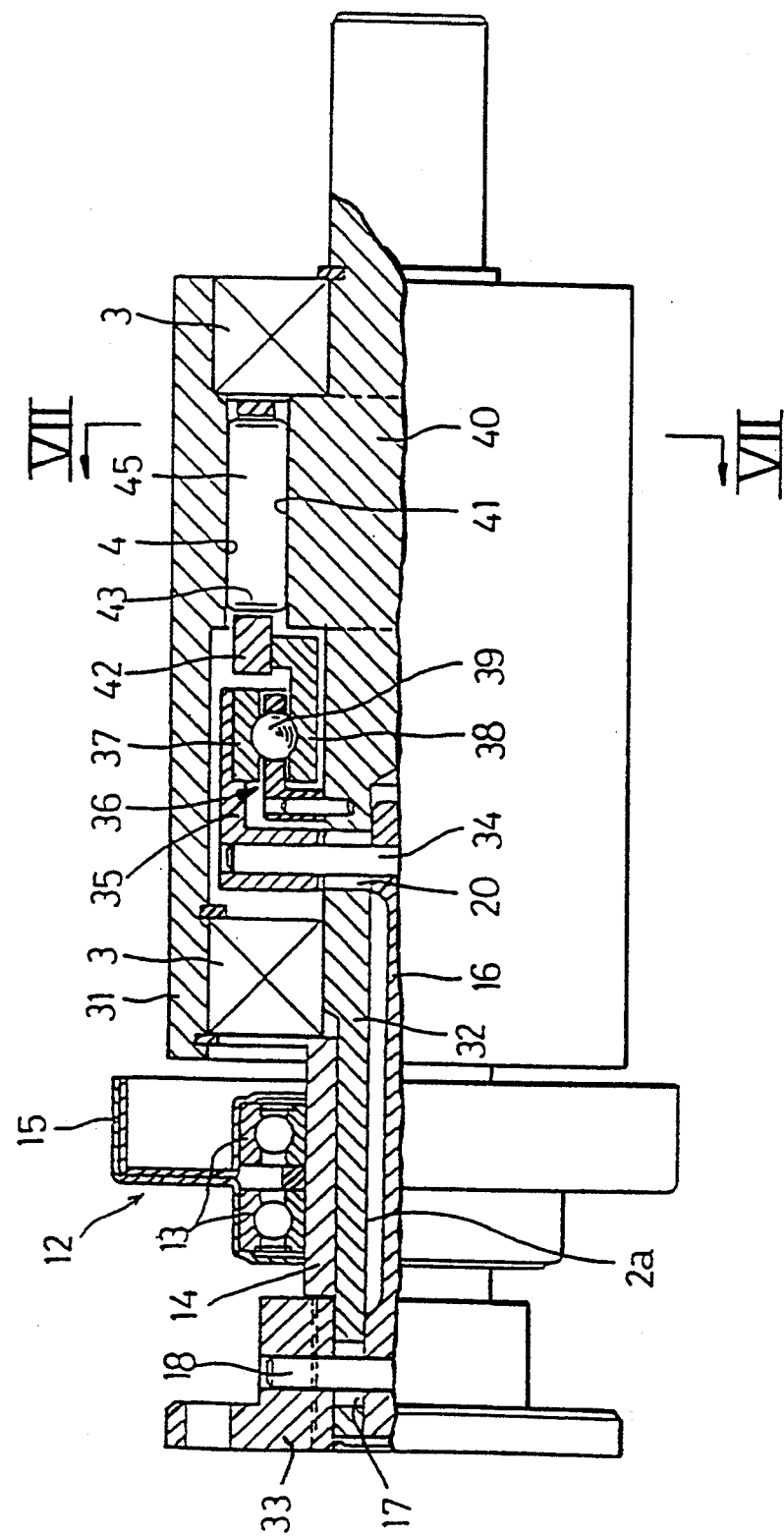
FIG. 6 is a Front view partially in vertical section of a second embodiment.
Figure 7:
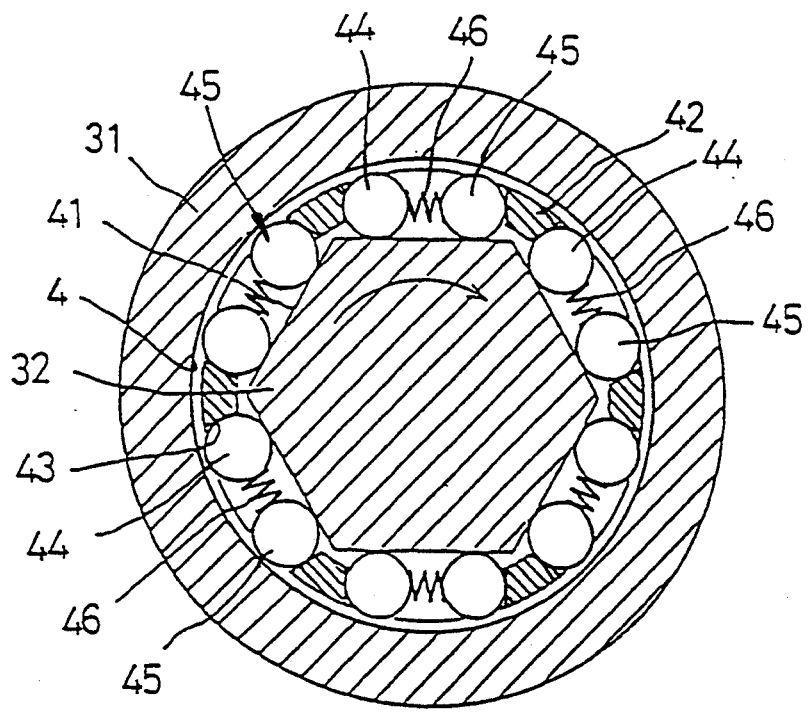
FIG. 7 a sectional view taken along line VII—VII of FIG. 6.
Figure 8:
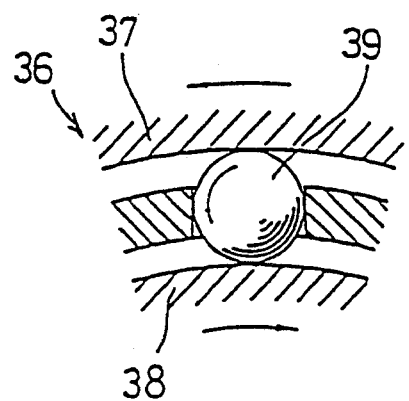
FIG. 8 is a sectional view of a portion of the torque reversing mechanism of the same.

FIGS. 6-8 show the second embodiment of the torque transmission device according to this invention.

In this embodiment, an input shaft 32 extends through an outer ring S1. An input ring 23 is coupled to the input shaft 32. An input shaft 32 has polygonal shaft portion 40 formed with flat engaging surfaces 41 on the outer periphery thereof. Between the engaging surfaces 41 and tile engaging surface 4 of the outer ring 31 are mounted a cage 42 formed with pockets 43 having the engaging surfaces 41. In each pocket 43, a pair of rollers 44 and 45 as engaging elements are mounted with an elastic member 46 disposed therebetween to press the rollers 44 and 45 against the circumferentially opposite end faces of the pocket 43. With the rollers 44 and 45 abutting the end faces of the pockets 43, gaps are formed between the rollers 44 and 45 and the engaging surfaces 4 and 41.

In the outer ring 31, a control ring 35 is rotatably mounted which is coupled to a control shaft 16 through a pin 34. The control ring 35 is coupled to the cage 42 through a torque reversal transmission mechanism 36, which is a rolling bearing comprising an outer ring 37, an inner ring 38 and rolling elements 39 pressed against both rings and held in position by a cage. The outer ring 37 is fixed on the control ring 35 and the inner ring 38 is fixed on the cage 42, which is in turn pinned to the input shaft 32.

When the outer ring 31 rotates together with the control ring 35 in the direction of arrow in FIG. 8, the rolling elements 39, which are in contact with the outer ring 37, rotate. Further, by the contact with the rolling elements 39, the inner ring 38 rotates in a direction opposite to the direction of rotation of the outer ring 37.

The same or similar elements as those of the first embodiment are denoted by the same numbers and their description is omitted.

In the second embodiment, when the input ring 33 rotates in the direction of arrow shown in FIG. 7 with respect to the input shaft 32, the cage 42 will rotate in the direction opposite to the direction of arrow, so that the lefthand side ones 44 of the pairs of rollers 44 and 45 mounted in the pockets 43 will come into contact with the engaging surfaces 41 of the input shaft 32 and the engaging surface 4 of the outer ring 31. When the input ring 33 rotates in the direction opposite to the above, the righthand rollers 45 will contact the engaging surfaces 4 and 41. Thus, the rotation of the input shaft 32 in either direction can be transmitted to the outer ring 31.

Third Embodiment

Figure 9:
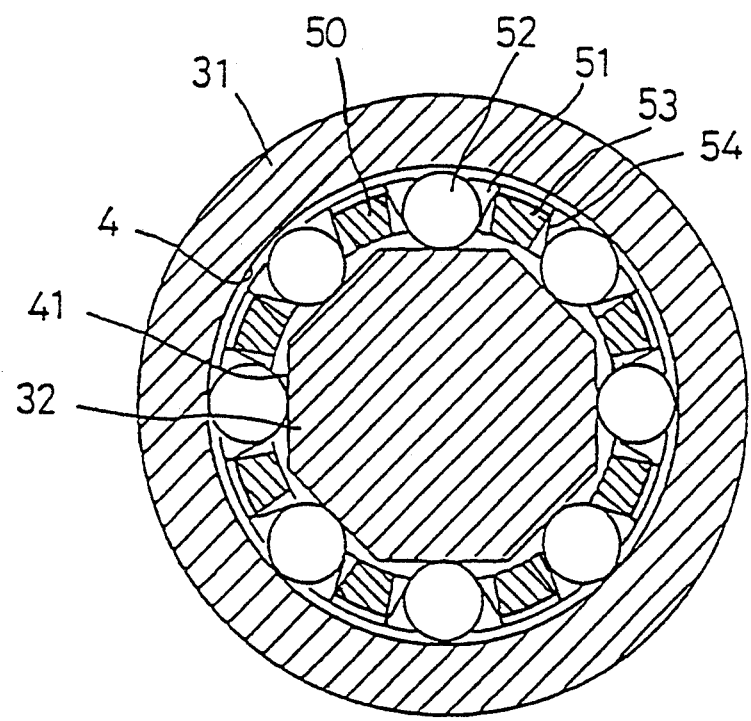
FIG. 9 is a sectional view of a third embodiment.

FIG. 9 shows the third embodiment of the torque transmission device according to this invention.

In this embodiment, a single roller 52 as an engaging element is mounted in each pocket 51 formed in a cage 50 mounted between the engaging surface 4 of the outer ring 31 and the flat engaging surfaces 41 of the input shaft 32. The roller 52 is biased from both sides by elastic members 54 supported on column portions 53 of the cage 50, and is maintained in its neutral position where it is not in engagement with the engaging surfaces 4 and 41. Otherwise this embodiment is the same in structure as the first and second embodiments.

In this embodiment, the cage rotates in a direction opposite to the direction of rotation of the input ring. When it rotates clockwise or counterclockwise, the rollers 52 move in the same direction as the cage 50, abutting the opposite engaging surfaces 4 and 41. The rotation of the input shaft 32 either clockwise or counterclockwise is thus transmitted to the outer ring 1.

By mounting one roller 52 in each pocket 51, the number of rollers can be increased compared with the second embodiment. This arrangement provides a two-way clutch having a large capacity.

Fourth Embodiment

Figure 11:
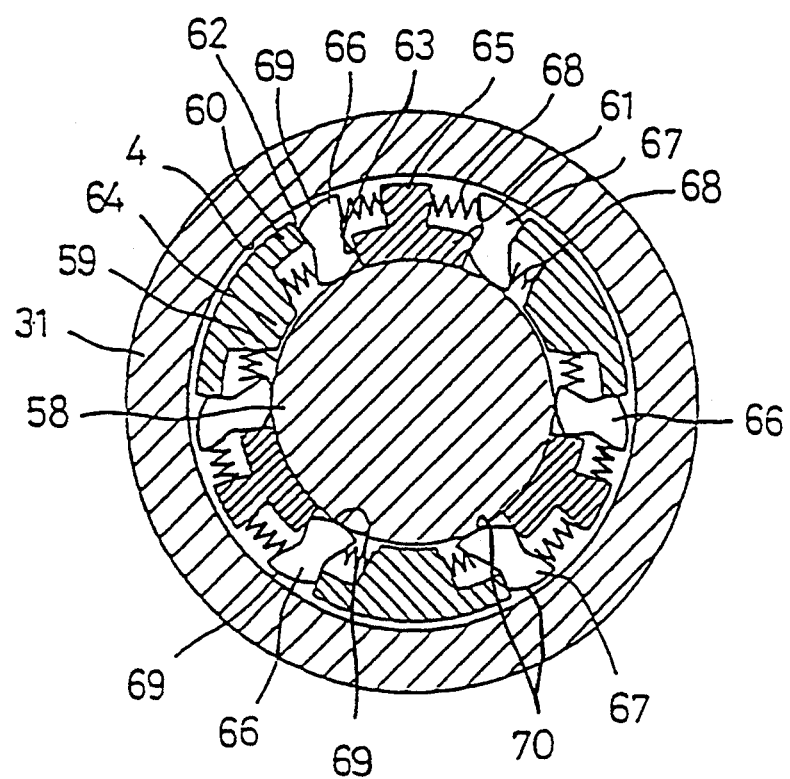
FIG. 11 is a sectional view taken along XI—XI of FIG. 10.
Figure 10:
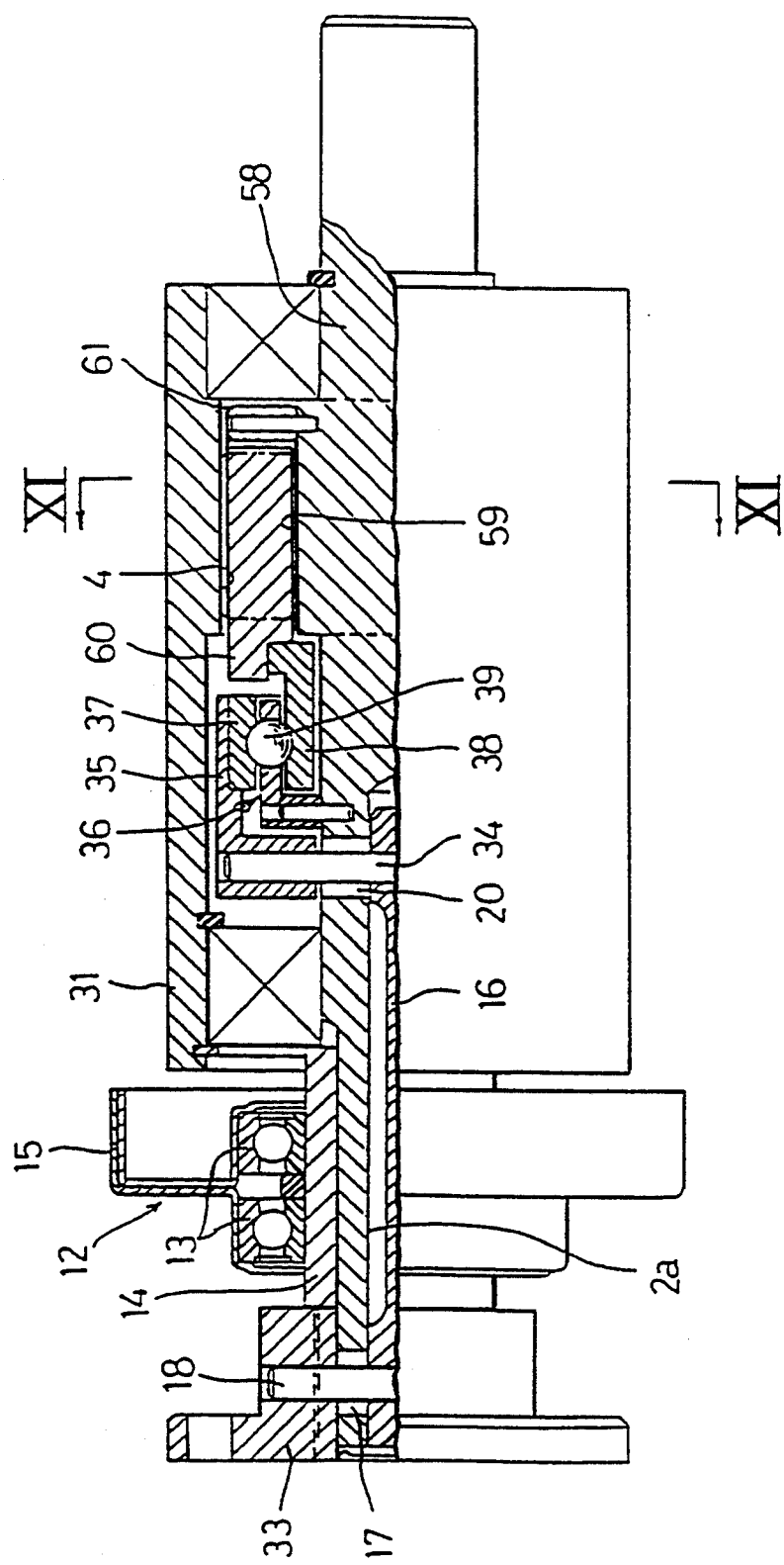
FIG. 10 is a front view partially in vertical section of a fourth embodiment.

FIGS. 10 and 11 show the fourth embodiment of the torque transmission device according to this invention.

In this embodiment, two cages 60 and 61 having different diameters are mounted between the cylindrical engaging surface 4 of the outer ring 31 and another cylindrical engaging surface 59 of an input shaft 58, with pockets 62 and 65 formed in the cages 60 and 61, respectively, offset from each other by a ½ pitch. The control ring 35 is connected to th large-diameter cage 60 through the torque reversal transmission mechanism 36. The small-diameter cage 61 is secured to the input shaft 58.

The cages 60 and 61 are provided with protrusions 64 and 65, respectively, engaged in the pockets of the other cages. Sprags 66 adapted to pivot 1 in a normal direction and sprags 67 adapted to pivot in a reverse direction are mounted so as to circumferentially alternate with each other between the opposed pairs or pockets 62 in the large-diameter cage 60 and pockets 63 in the small-diameter cage 61. The sprags 66 and 67 are held in the neutral position by elastic members 68 mounted between the protrusions 64 and 65. The sprags 66 for normal pivoting and the sprags 67 for reverse pivoting are arranged symmetrically. When the large-diameter cage 60 turns to the lefthand side of FIG. 11 with respect to the small-diameter cage 61, the sprags 66 for normal pivoting will tilt in the direction of rotation of the cage 60. Their arcuate surfaces 69 at both ends will abut the engaging surfaces 4 and 59.

On the other hand, when the large-diameter cage 60 turns to the righthand side with respect to the small-diameter cage 61, the sprag 67 for reverse pivoting will tilt in the direction of rotation of the cage 60, causing their arcuate surfaces 70 at both ends to engage with the engaging surfaces 4 and 59.

In the fourth embodiment, when the input ring 33 rotates relative to the input shaft 58, either the sprags 66 for normal pivoting or the sprags 67 for reverse pivoting will abut the engaging surfaces 4 and 59. Thus, the rotation of the input shaft 58 in either clockwise or counterclockwise direction can be transmitted to the outer ring 1.

Fifth Embodiment

Figure 13:
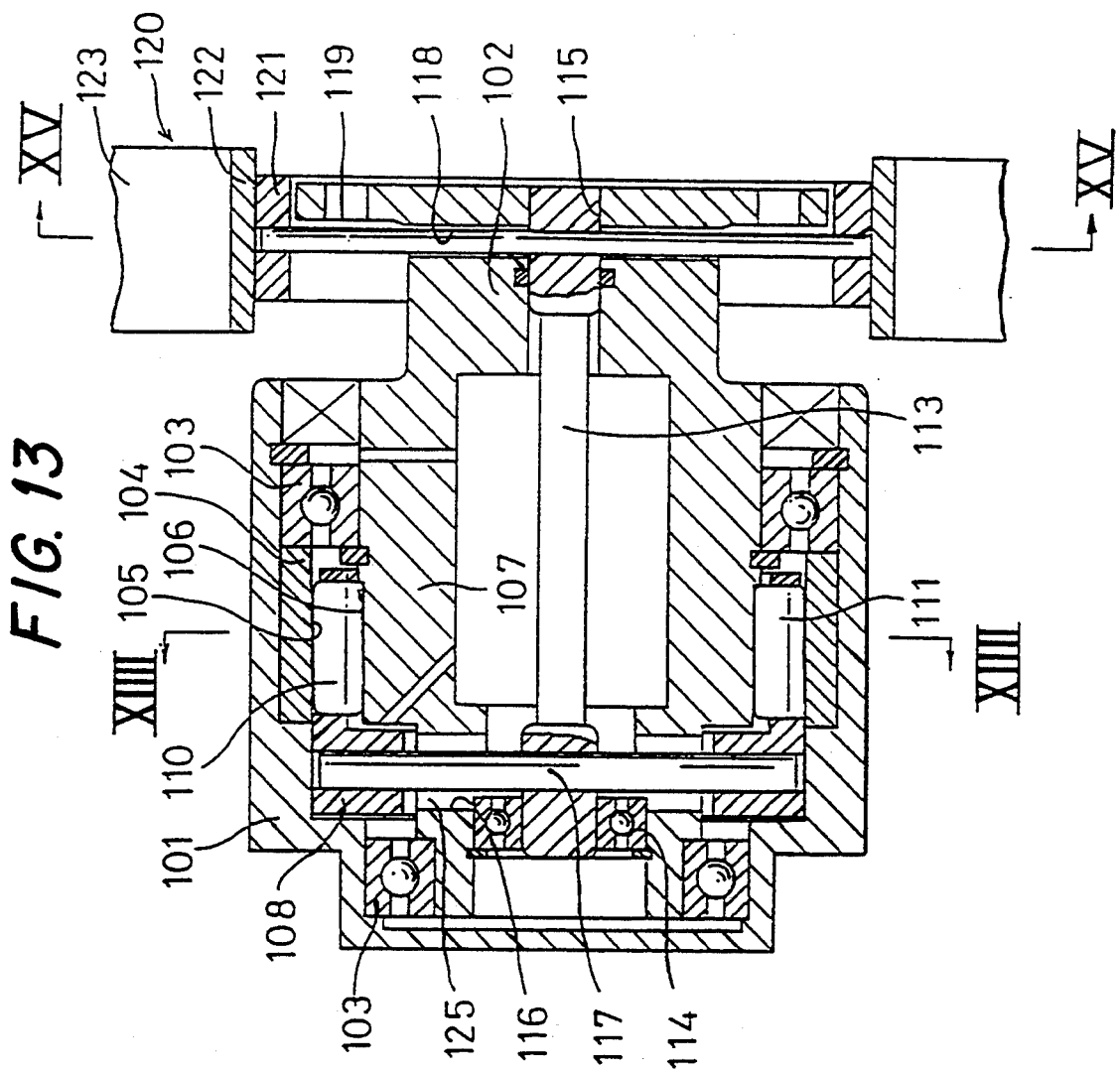
FIG. 13 is a front view partially in vertical section of a fifth embodiment.
Figure 15:
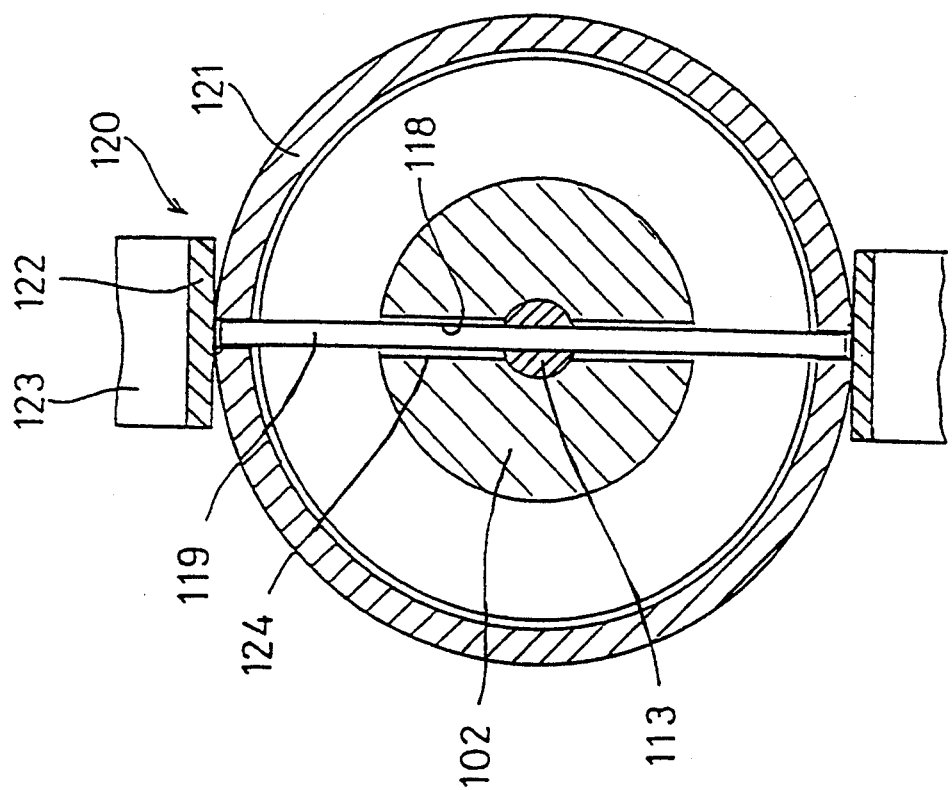
FIG. 15 is a sectional view taken along line XV—XV of FIG. 15.
Figure 14:
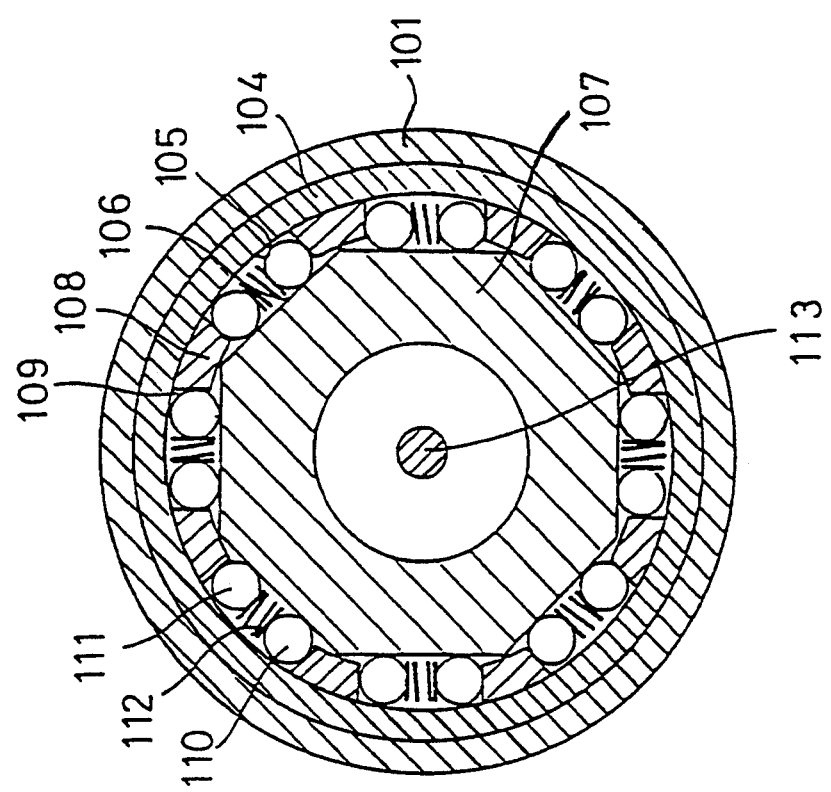
FIG. 14 is a sectional view taken along line XIV—XIV of FIG. 13.

FIGS. 13–15 show tile fifth embodiment. As shown in tile drawings, an input shaft 102 has one end thereof inserted in an outer ring 101 and is rotatably supported by two bearings 103 mounted therebetween.

A sleeve 104 is press-fitted on the inner peripheral surface of the outer ring 101. It is Formed on the inner peripheral surface with a cylindrical engaging surface 105. The input shaft 102 has a square Shaft portion 107 located opposite the sleeve 104. The square shaft portion 107 is Formed on the outer periphery thereof with a plurality of engaging surfaces 106 serving as wedge-like cam surfaces with respect to the engaging surfaces 105.

An annular cage 108 is rotatably mounted between the engaging surfaces 105 and 106. The cage 108 is formed with pockets 109 opposite the engaging surfaces 106. A pair of rollers 110 and 111 as engaging elements are mounted in each pocket 109 with an elastic member 112 disposed between the rollers 110 and 111 to press them against the side faces of the pockets 109 circumferentially opposite to each other. In a normal assembled state, gaps are provided between the rollers 110 and 111 ad the engaging surfaces 105 and 106. When the cage 108 ad the input shaft 102 rotate relative to each other either clockwise or counterclockwise, the rollers 110 and 111 are pushed by the side faces of the pockets 109, so, that either the rollers 110 and 111 will engage both the engaging surfaces 105 and 106 alternately.

On the other hand, a control shaft 113 mounted in the input shaft 102 along its central axis is rotatably supported by a bearing 114 and a guide hole 115. The cage 108 is coupled to one end of the control shaft 113 through a coupling pin 117 extending through a pin hole 116 formed in the input shaft 102.

A coupling pin 119 extends through a pin hole 118 Formed in the leading end of the input shaft 102 at the other end of the control shaft 113. A friction generating means 120 is coupled to the ends of the coupling pin 119.

The friction generating means 120 comprises an annular rotary member 121 coupled to the ends of the coupling pin 119, a friction member 122 kept in sliding contact with the peripheral surface of the rotary member 121, and arms 123 For coupling the friction member %o a stationary member (not shown). It serves to reduce the revolving speed of the rotary member 121 by the frictional force resulting From the sliding contact between he rotary member 121 and the friction member 122.

Between the coupling pin 119 coupled to the rotary member 121 and the pin hole 118, h gap 124 is provided in the direction of rotation which is larger than the distance by which the rollers 110 and 111 move from the neutral position until they contact the engaging surfaces 105 and 106. The gap 124 in the direction of rotation is smaller than a circumferential gap 125 defined between the coupling pin 117 and the pin hole 116.

In operation, when the input shaft 102 rotates in one direction, the rotation of the control shaft 113 is retarded because it is decelerated by the friction generating means 120. The cage 108 thus rotates relative to the input shaft 102 by a distance equal to the size of the gap 124 in the direction of rotation. By this movement of the cage, the rollers 110 and 111 are pushed in a direction opposite to the direction of rotation of the input shaft 102, coming into contact with the engaging surfaces 105 and 106.

If in this state the input shaft 102 begins to rotate faster than the outer ring 101, the rollers, which are in the operative position, instantly engage with the engaging surfaces 105 and 106, causing the outer ring to rotate with the input shaft.

In contrast, if the outer ring 101 rotates faster than the input shaft 102, the outer ring 101 overruns the rollers 110 and 111, thereby holding the rollers from engaging between the engaging surfaces 105 and 106. In this state, the outer ring keeps rotating separate from the input shaft.

On the other hand, if the input shaft 102 rotates the reverse direction, the cage 108 will move in the reverse direction so that the rollers move to the engaging operative position. Namely, since the engaging position of the rollers 110 and 111 changes according to the direction of rotation of the input shaft 102, the driving force can be transmitted and cut off in either direction in completely the same manner.

Figure 31:
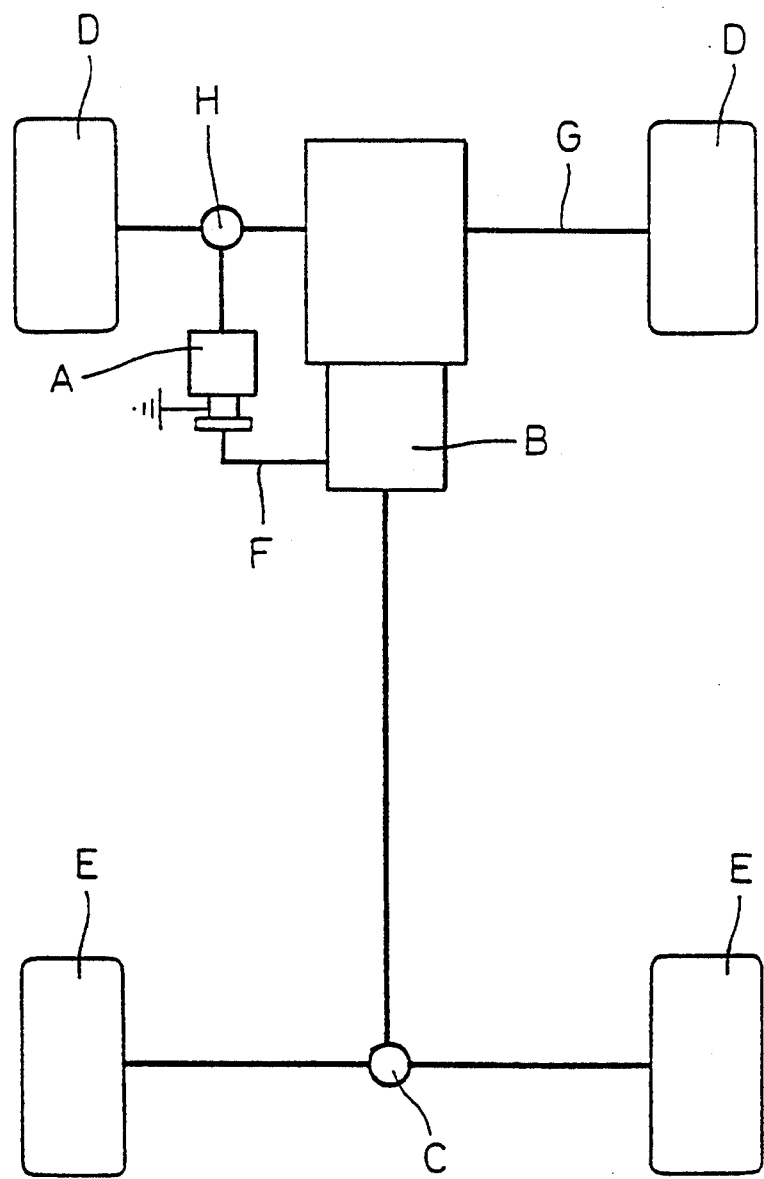
FIG. 31 is a view showing another example in which the torque transmission device is mounted on an automobile.

In mounting the torque transmission device A of this embodiment on a four-wheel drive vehicle as shown in FIG. 31 in which the rear wheels E are driven, the input shaft 102 is coupled to a drive shaft F branching from a transfer B and the outer ring 101 is coupled to a shaft extending to a front differential H of the front axle G.

In this arrangement, while the vehicle is moving straight, only the rear wheels E ape driven while the front wheels D are merely rotating with the rear wheels. Since there is no difference in the revolving speed between the input shaft 102 and the outer ring 101, the rollers 110 and 111 are kept out of engagement and the input shaft and the outer ring are rotating separately from each other.

If the rear wheels slip and the vehicle speed drops, the rotation of the drive shaft F becomes higher than that of the front wheels which are being decelerated. Thus, the rollers 110 and 111 in the torque transmission device A engage with the engaging surfaces 105 and 106. As a result, the torque of the drive shaft F is transmitted to the front axle G, changing the drive mode into four-wheel drive.

On the other hand, if the four-wheel drive mode sets in while the vehicle is passing a tight corner, due to the tendency of the front wheels to rotate faster than the rear wheels, the outer ring 101 tends to rotate faster than the input shaft 102. This causes the Overrunning of the outer ring 101, thus keeping the rollers 110 and 111 from coming into engagement with the engaging surfaces 105 and 106. Since in this state the movement of the front wheels is not restricted by the movement of the rear wheels, no braking will occur.

If the driven wheels, that is the rear wheels should slip while the vehicle is in motion, the drive mode will be automatically switched to the four wheel position. Thus, even if the front wheels begin to rotate faster than the rear wheels while the vehicle is passing a tight corner, the difference in the revolving sped between the front and rear wheels is absorbed by the overrunning of the outer ring. This ensures smooth and stable run of the vehicle.

Sixth Embodiment

Figure 16:
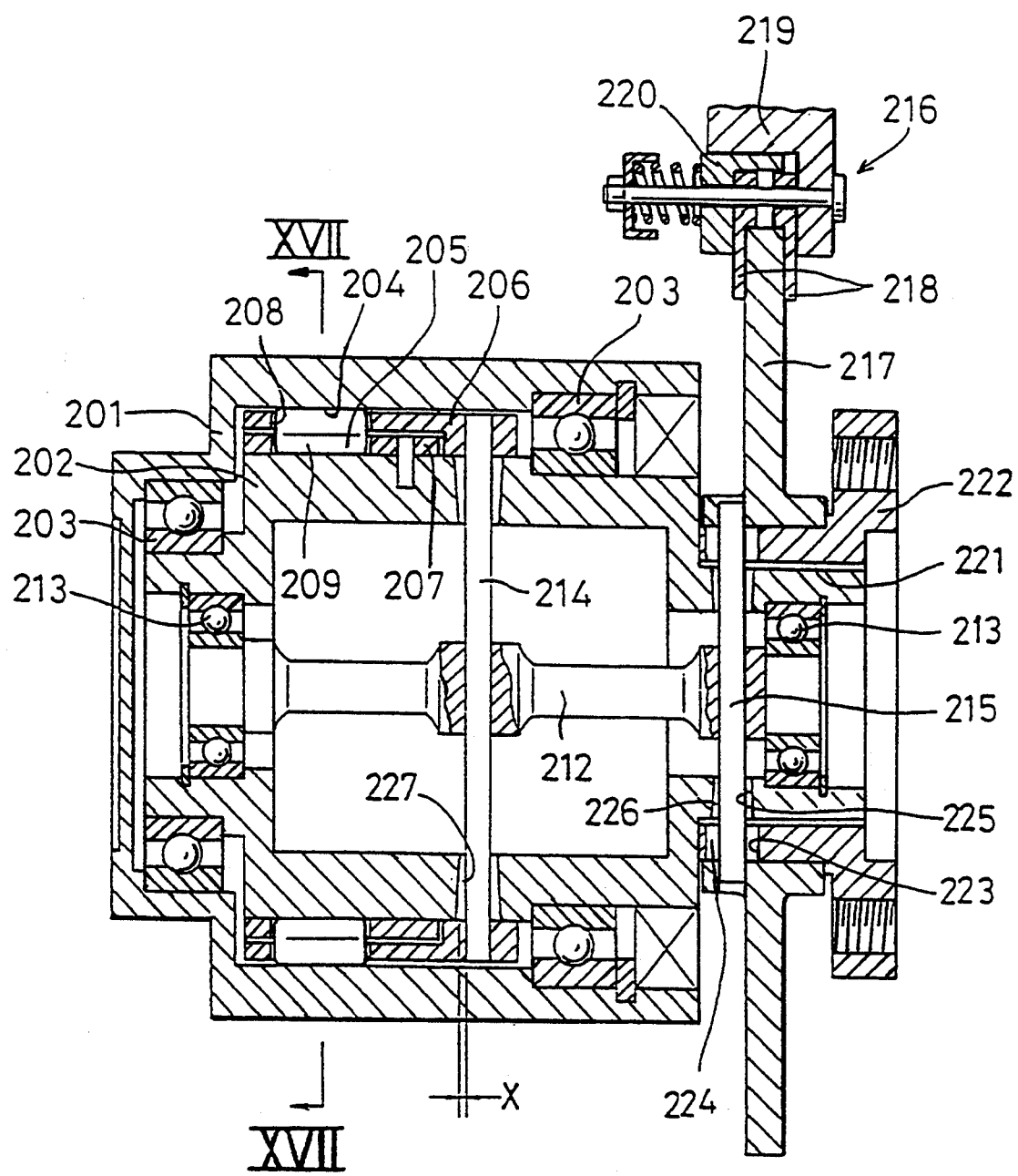
FIG. 16 is a front view partially in vertical section of a sixth embodiment.
Figure 17:
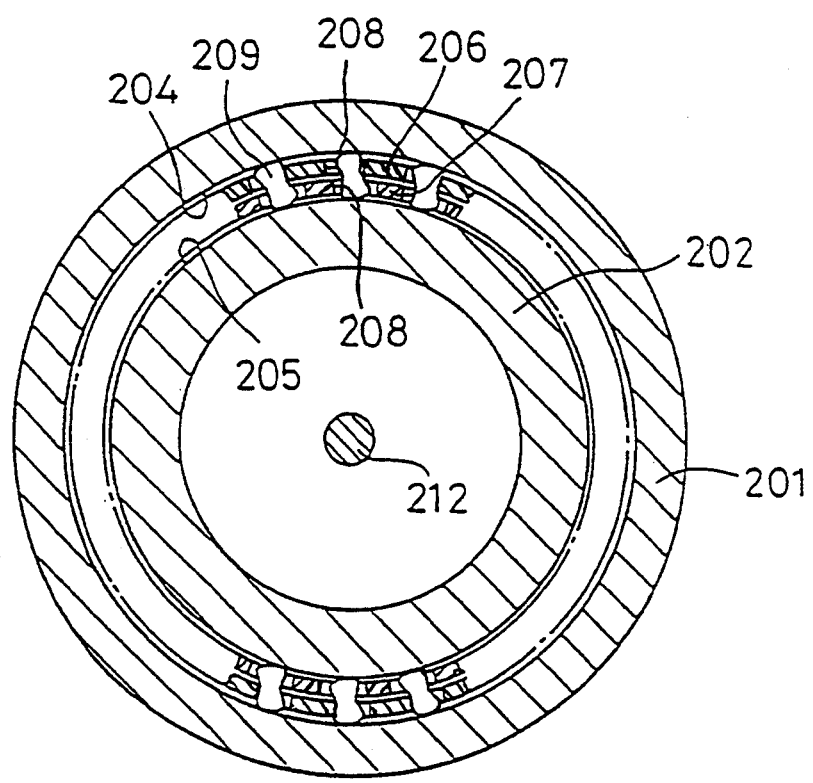
FIG. 17 is a sectional view taken along line XVII—XVII of FIG. 16.
Figure 18:
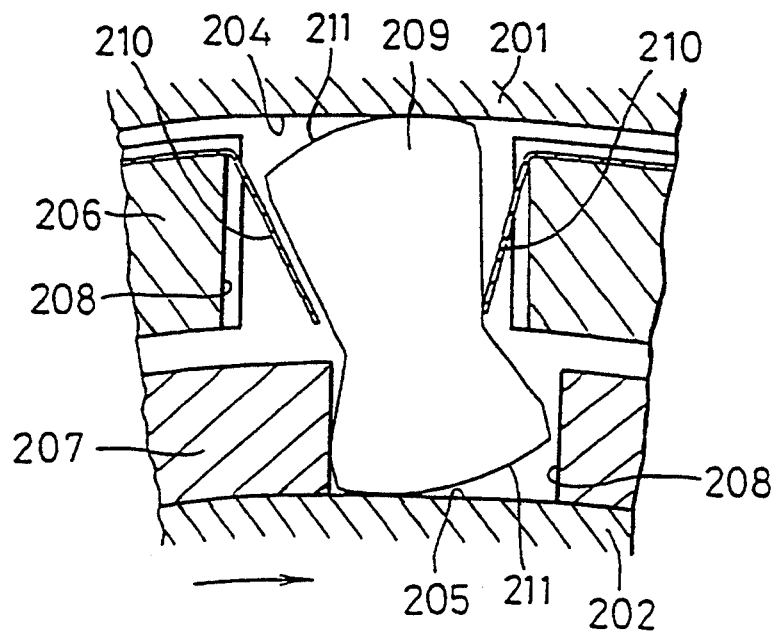
FIG. 18 is a sectional view showing how the sprag operates.

FIGS. 16–18 show the sixth embodiment. In this embodiment, with an outer ring 201 and an input shaft 202 supported by a bearing 205, cylindrical engaging surfaces 204 and 205 are formed on the inner peripheral surface of an outer ring 201 and the outer peripheral surface of an input shaft 202, respectively. Between the engaging surfaces 204 and 205 are mounted a large-diameter rotatable control cage 208 and a small-diameter fixed cage 207 pinned to the input shaft 202.

The cages 206 and 207 are formed on the peripheral surfaces thereof with a plurality of pockets 208, respectively, which are located opposite to each other. Sprags 209 and elastic members 210 are mounted in the pockets 208. As shown in FIG. 18, the sprags 209 have arcuate surfaces 211 at the outer and inner ends having a center of curvature on the central axis of the sprags. When the sprags 209 tilt in either direction by a predetermined angle, they will engage between the engaging surfaces 204 and 205, coupling th outer ring 201 and the input shaft 202 together. The sprags 209 are urged at both sides by the elastic members 210 supported by the control cage 206 to keep them in a neutral position where their arcuate surfaces 211 do not engage with the surfaces 204, 205.

A control shaft 212 is provided in the center of the input shaft 202, rotatably supported by two bearings 213. The control cage 206 is coupled to a coupling pin 214 mounted on the central part of th control shaft 212. A Friction generating means 216 has its rotary member 217 coupled to a coupling pin 215 mounted on the tip of the control shaft 212.

The friction generating means 216 comprises friction members 218 sandwiching the end face of the rotary member 217, an arm 219 for supporting the friction members 218 to an external fixing member, and a biasing member 220 for pressing the friction members 218 against the rotary member 217. The means 216 serves to decelerate the movement of the rotary member 217 by the frictional resistance resulting from the sliding contact between the friction members 218 and the rotary member 217. In this case, in order that a stable braking force can be applied continuously to the rotary member 217 rotating at high speed, the friction members 218 are preferably made of a material having a high wear resistance and such a small coefficient of friction as to allow it to be used without lubrication.

An input flange member 222 as an input end of the driving power is coupled to the tip of the input shaft 202 through a spline 221 press-fitted thereto. Circumferential gaps 224 are defined between pin holes 225 formed in the flange portion 222 and the coupling pin 215. The gaps 224 are larger than gaps 226 provided between pin holes 225 of the input shaft 202 and the coupling pin 215.

Gaps 226 in the direction of rotation which are formed around the coupling pin 215 are larger than gaps X in the direction of rotation which are formed between the coupling pin 214 and the pin holes 227. The gaps X in the direction of rotation determine the angle of delay of the control shaft 206 with respect to the input shaft 202. The size of the gap X is set larger than the distance by which each sprag 209 moves from its neutral position until it engages with the engaging surfaces 204 and 205.

In operation, when the input shaft 202 rotates, the rotation of the control cage 206 is retarded due To tile braking effect of the friction generating means 216. Thus, by the relative rotation between the cages 206 and 207, the sprags 209 will tilt to take their engaging operative position.

In this case, the control cage 206, which rotates slower than the input shaft 202, is in engagement with the sprags 209 at their large-diameter side. Thus, as shown in FIG. 18, the sprags 209 will tilt in a direction opposite to the direction of rotation (arrow) of the input shaft 202. As the input shaft 202 begins to rotate faster, the sprags 209 will bite instantly into the engaging surfaces 204 and 205 without slipping. This ensures reliable transmission of the driving force to the outer ring 201.

Seventh Embodiment

Figure 19:
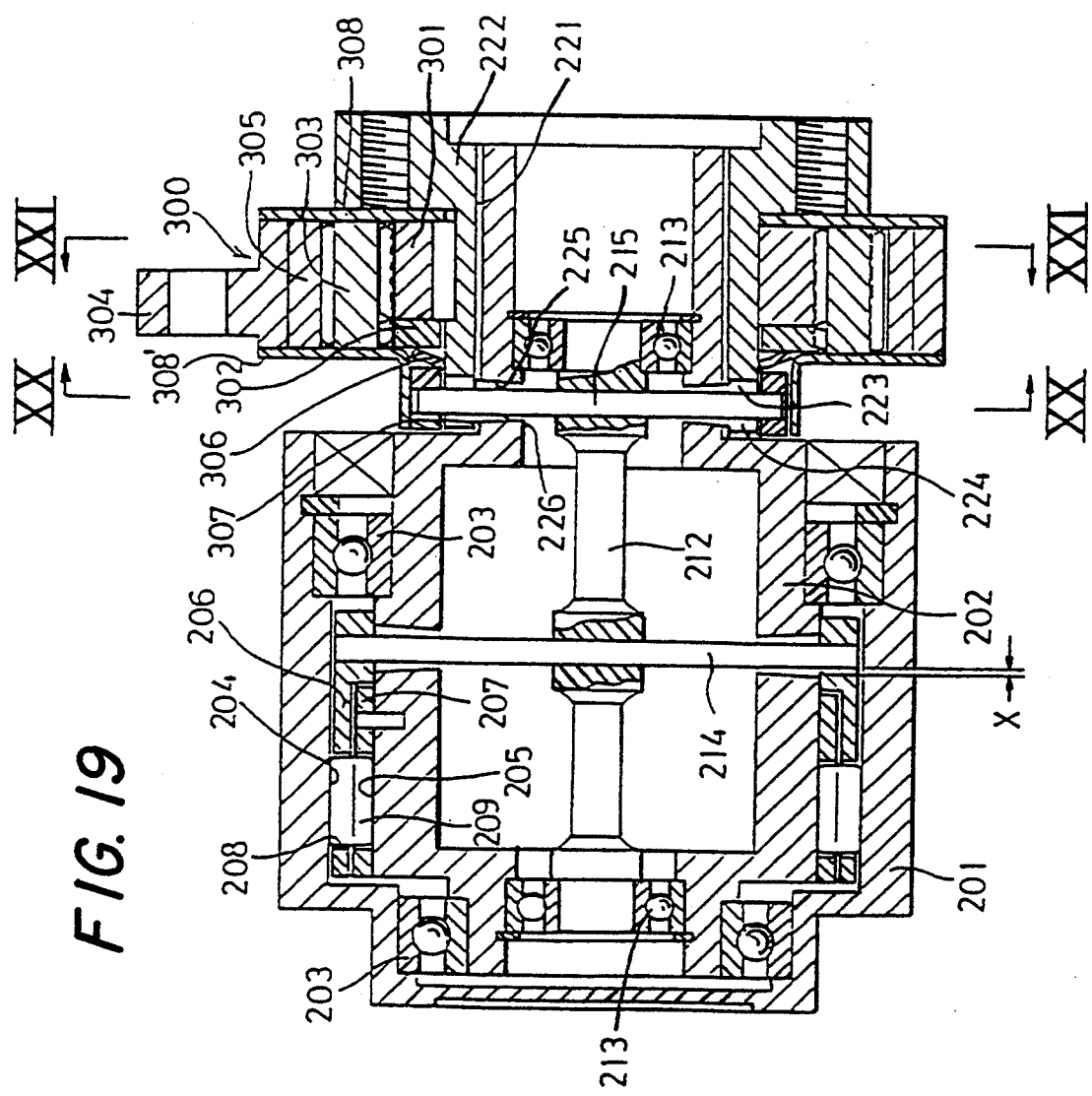
FIG. 19 is a front view partially in vertical section of a seventh embodiment.
Figure 21:
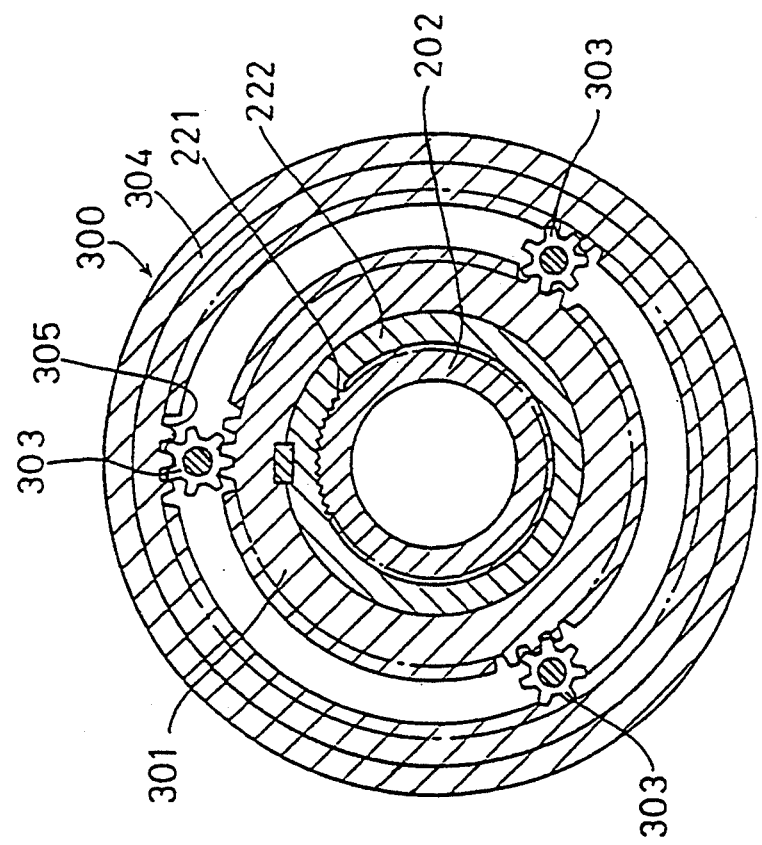
FIG. 21 is a sectional view is taken along line XXI—XXI of FIG. 19.
Figure 20:
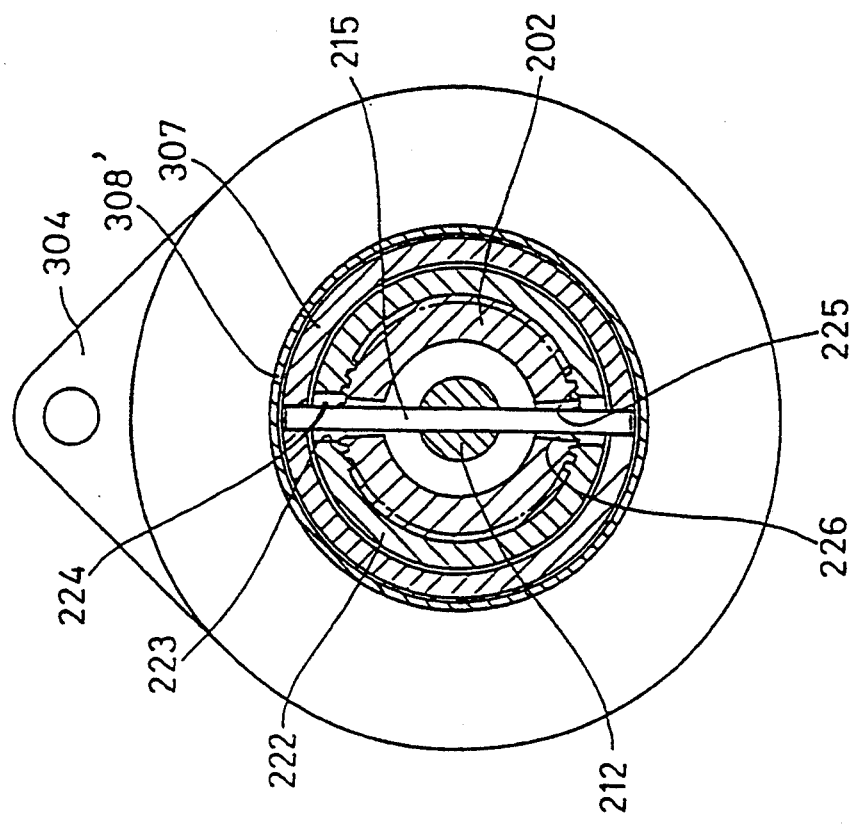
FIG. 20 is a sectional view taken along line XX—XX of FIG. 19.

FIGS. 19–21 show the seventh embodiment.

The basic structure of the clutch portion of the seventh embodiment is substantially the same as the sixth embodiment. It differs in that a gear reduction mechanism 300 is coupled to the control shaft 212 as the differential means.

Namely, as shown in FIG. 20, to the tip of the control shaft 212 is secured a coupling pin 215 extending through pin holes 225 formed in the input shaft 202 with gaps 226 in the direction of rotation defined left therebetween. The gear reduction mechanism 500 s mounted between the coupling pin 215 and the input flange member 222.

As shown in FIGS. 19 to 21, the gear reduction mechanism 300 comprises a sun gear 301 fixedly mounted on the input flange member 222, a shifted gear 502 mounted in parallel to the sun gear 301 and rotatable with respect to the sun gear 501 and the flange member 222, a fixed gear 505 formed on an external fixed member 504, and a plurality of planet gears 505 meshing with the sun gear 501 and the shifted gear 502. The shifted gear 502 has several more teeth than the sun gear 501.

A rotary member 507 coupled to the coupling pin 215 is kept in sliding contact with the side of the shifted gear 502 through an elastic member 506. Side plates 508 for guiding the gears are provided.

When the sun gear 501 of the gear reduction mechanism 500 rotates together with the flange member 222, the shifted gear 302 is rotated through the planet gear 303. Since tile shifted gear 302 has a greater number of teeth than the sun gear 301, the former will rotate slower than the latter by the amount corresponding to the difference the number of teeth. The delay in rotation is conveyed to the control shaft 212 through the coupling pin 215, thus reducing the revolving speed of the control shaft 212 with respect to the input shaft 202.

The same elements as those of the sixth embodiments are denoted by the same numerals and their description is omitted.

In operation, when the input shaft 202 rotates in one direction, the rotation of the control shaft 212 is retarded since it is decelerated by the gear reduction mechanism 300, thereby causing the control cage 206 to rotate relative to tile input shaft; 202 and the fixed cage 207 by the amount equal to the gaps 226 in the direction of rotation. By this relative rotation between the cages 206 and 207, tile sprags 209 will tilt in a direction opposite to the direction of rotation of the input shaft 202 (arrow), coming into contact with the engaging surfaces 204 and 205.

The gear reduction mechanism shown in this embodiment is a mere example. Any other gear mechanism may be used as long as it is capable of developing a difference in revolving speed between the input shaft and the control shaft.

Eighth Embodiment

Figure 22:
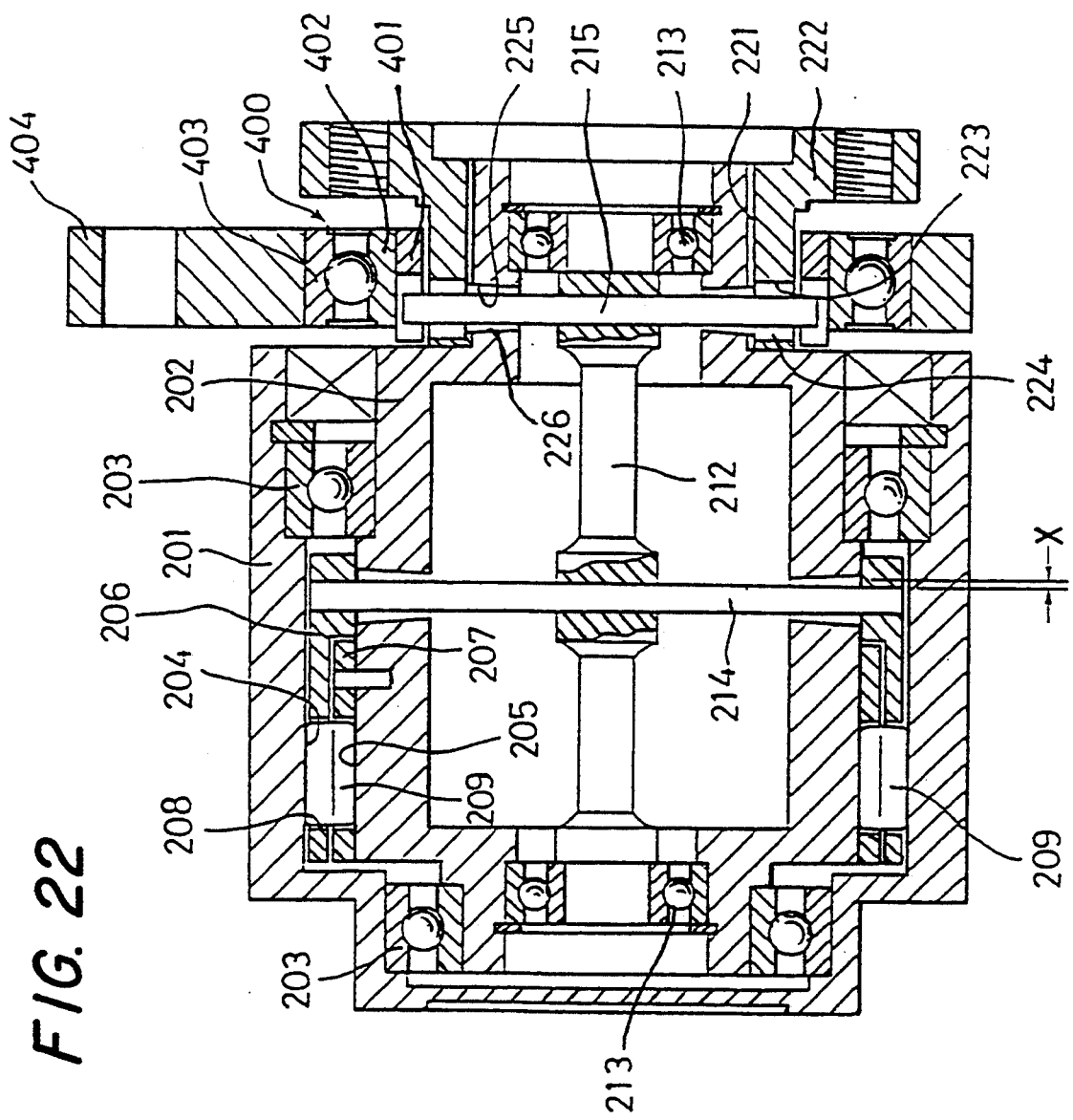
FIG. 22 is a front view partially in vertical section of an eighth embodiment.

FIG. 22 shows the eighth embodiment.

The eighth embodiment differs from the sixth and seventh embodiments in that a differential bearing 400 as the differential means is coupled to the control shaft 212. The eighth to 13th embodiments, to be described hereinafter, show various examples of the differential bearing, The elements in these embodiments that are the same or similar as those of the sixth embodiments are denoted by the same numerals and its description is omitted, In this embodiment, sleeve 40 pressed into differential bearing 400 is integrally coupled to the tip of coupling pin 215 coupled to control shaft 212.

The differential bearing 400 is a ball bearing having a single row of deep groove. It has an inner ring 402 fitted on a sleeve 401 and an outer ring 403 fitted in an arm 404 coupled to an external liking member (not shown). The differential bearing 400 has its outer ring press-fitted in tile arm 404 to provide a negative radial gap therebetween and thus to increase the resistance to rotation while rolling, This resistance to rotation is set to be larger than the resistance to rotation offered by the bearings 215 supporting the input shaft 202. Thus, the control shaft 212 coupled to the coupling pin 215 is braked to rotate slower than the input shaft 202.

In operation, when the input shaft 202 rotates in one direction, since the control shaft 212 is decelerated by the differential bearing 400, its rotation is retarded, thereby causing the control cage 206 to rotate relative to the input shaft 202 and the fixed cage 207 by the amount equal to the gaps X in the direction of rotation. By this relative rotation between the cages 206 and 207, he sprags 209 will tilt in a direction opposite to the direction of rotation of the input shaft 202 (arrow), coming into engagement with the engaging surfaces 204 and 205

Ninth embodiment

Figure 23:
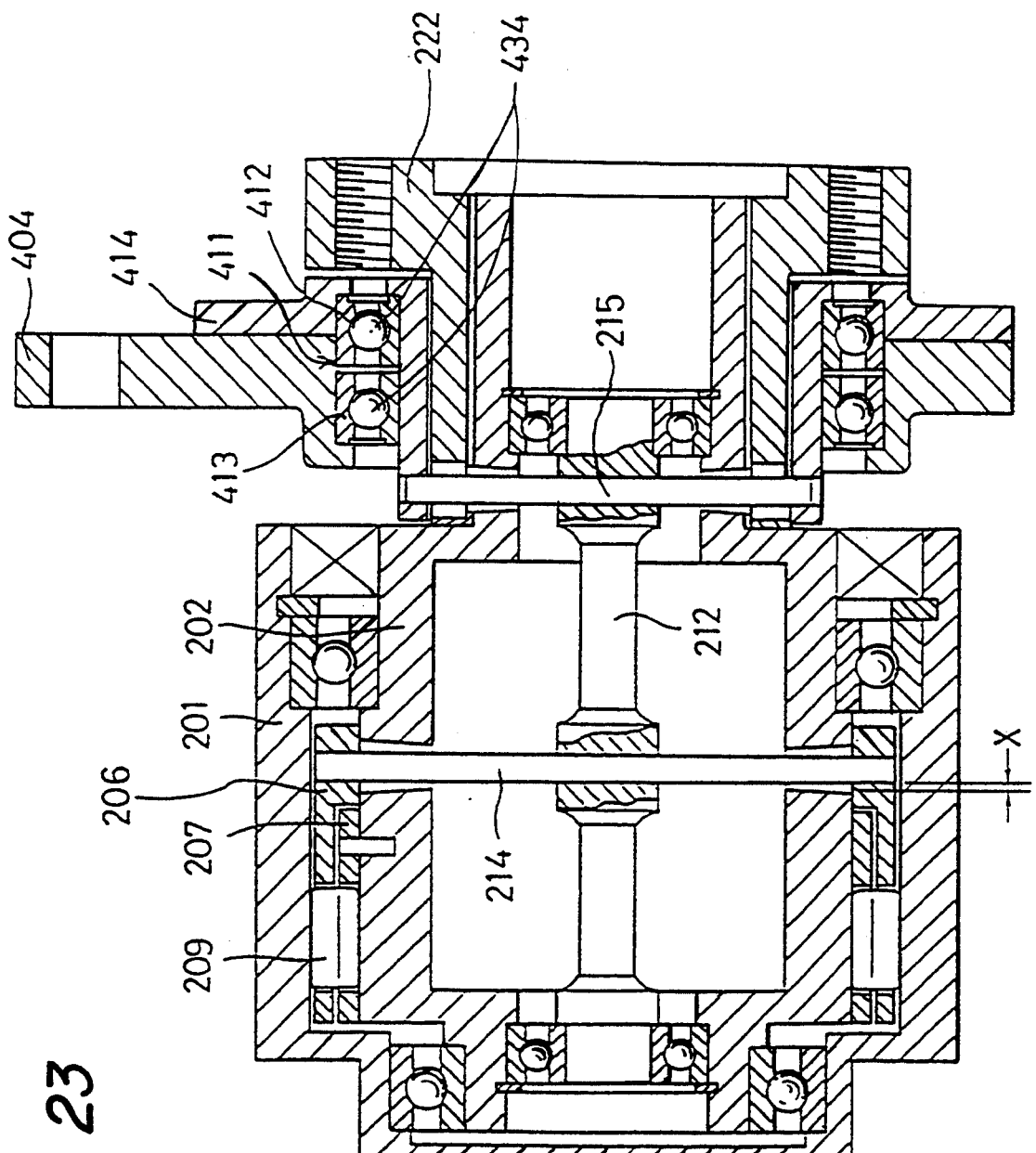
FIG. 23 is a front view partially in vertical section of a ninth embodiment.

FIG. 23 shows the ninth embodiment. In this embodiment, a differential bearing 411 comprises two polling bearings 412 and 413 arranged in parallel to each other. An axial pretension is applied to the rolling bearings 412 and 413 with a thrust plate 414 to impart a required resistance to rotation.

Providing a plurality of rolling bearings offers an advantage that the resistance applied to each bearing can be reduced compared with the case in which the resistance to rotation is provided with a single bearing. This advantage allows use in high-speed rotation.

Tenth Embodiment

Figure 24:
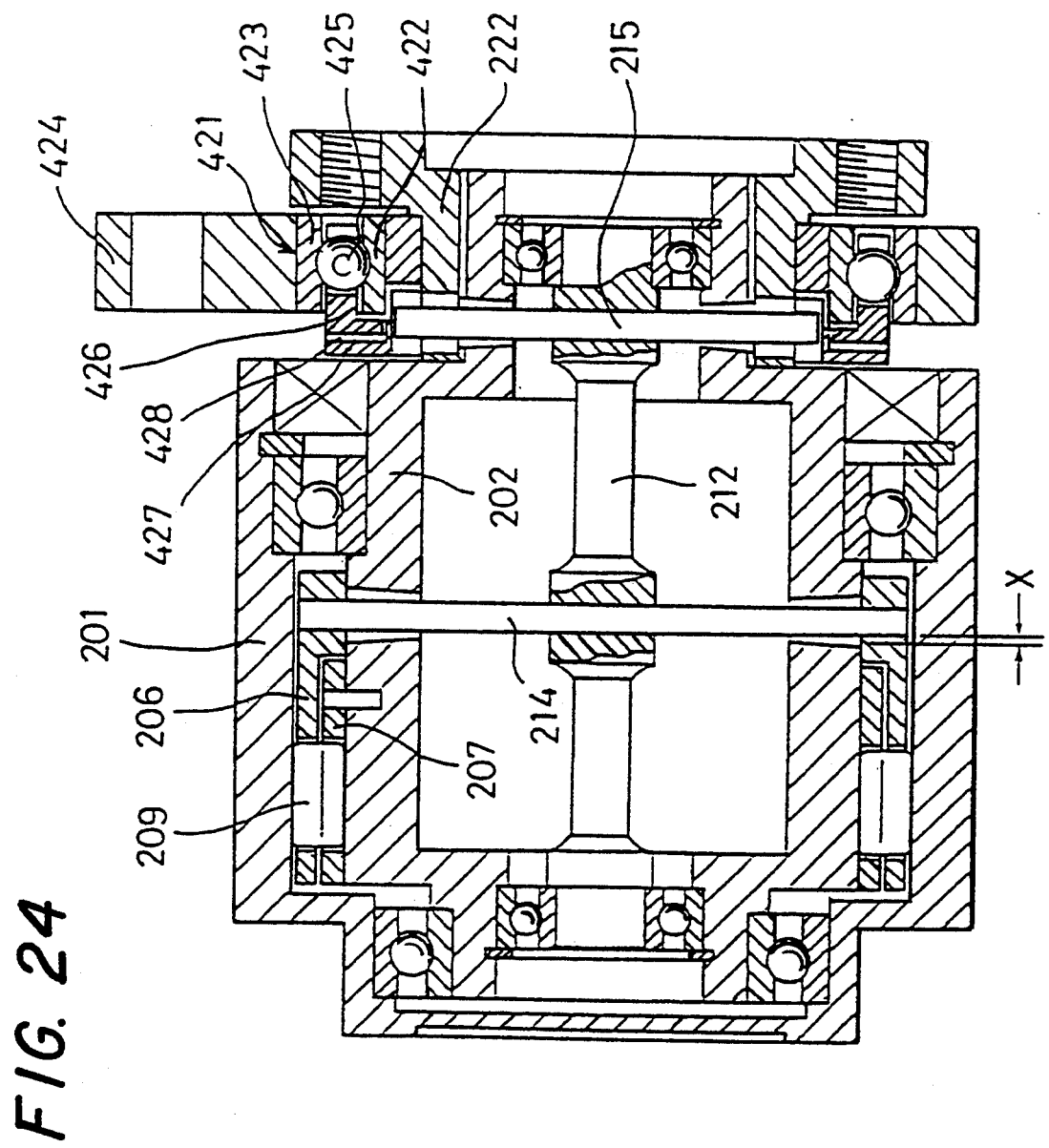
FIG. 24 is a vertical sectional front view of a 10th embodiment.

FIG. 24 shows the 10th embodiment. In this embodiment, a differential bearing 421, comprises a single radial bearing having an inner ring 422 mounted on the Flange member 222 and an outer ring 423 fixed to a fixing arm 424. It also has balls 425 mounted between the inner and outer rings 422 and 423 and a cage 426 for the balls 425 which is kept in sliding contact with a rotary member 427 coupled to the coupling pin 215, through a slide member 428.

The differential bearing 421 has a radial gap set to near zero. A lubricant having a high friction coefficient such as traction grease is sealed therein to prevent slip between the balls 425 and the cage 426.

In this arrangement, since the outer ring 423 of the differential bearing 421 is fixed, the cage 426 rotates at the rate of about 1/2.5 of the rotation of the inner ring 422. Thus, a decelerating force is applied to the rotary member 427 by the cage 426 to retard with respect to the flange member 222. This force serves to retard the rotation of the control shaft 212 compared with the input shaft 202.

Eleventh Embodiment

Figure 25:
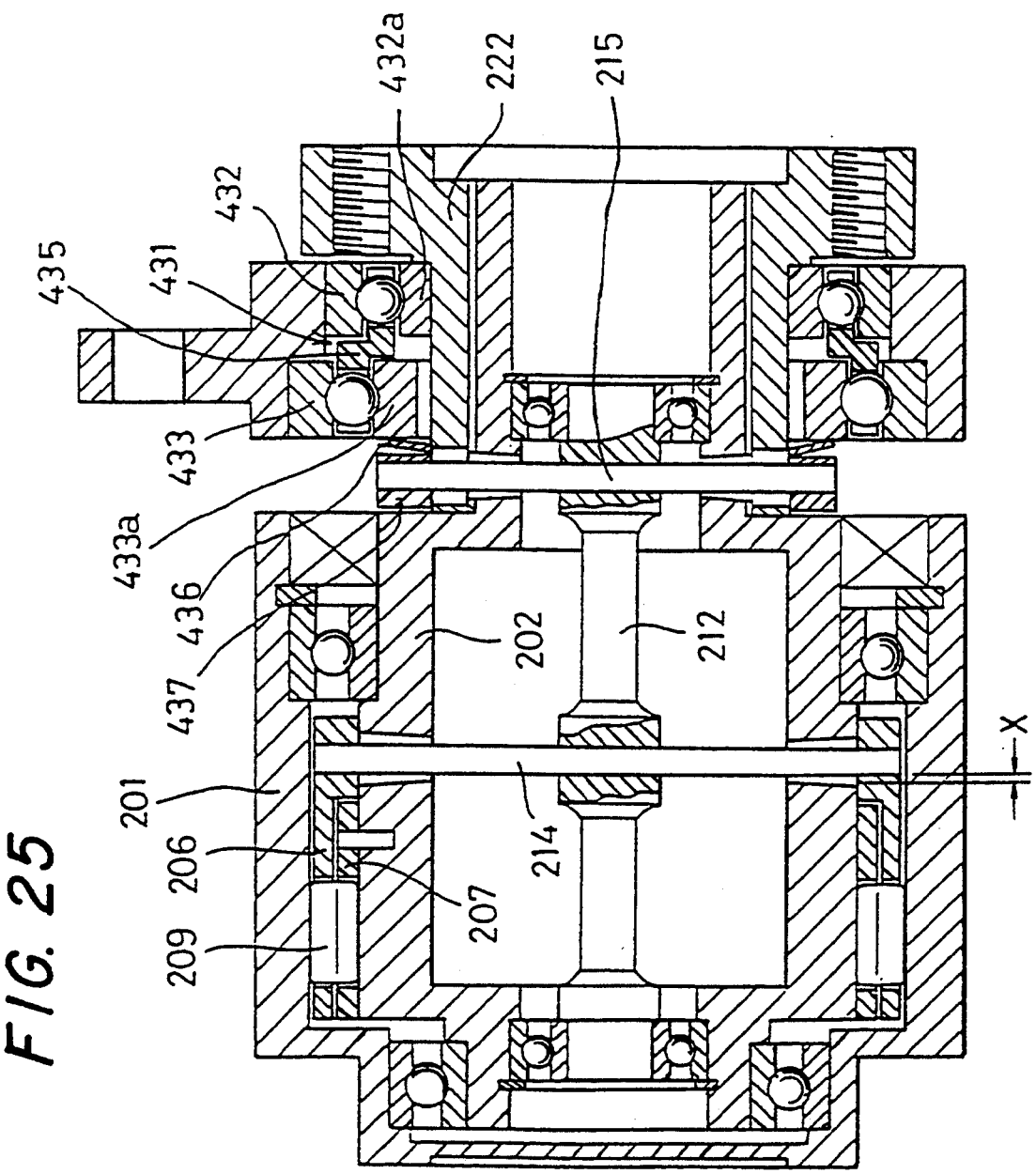
FIG. 25 is a vertical sectional front view of an 11th embodiment.
Figure 26:
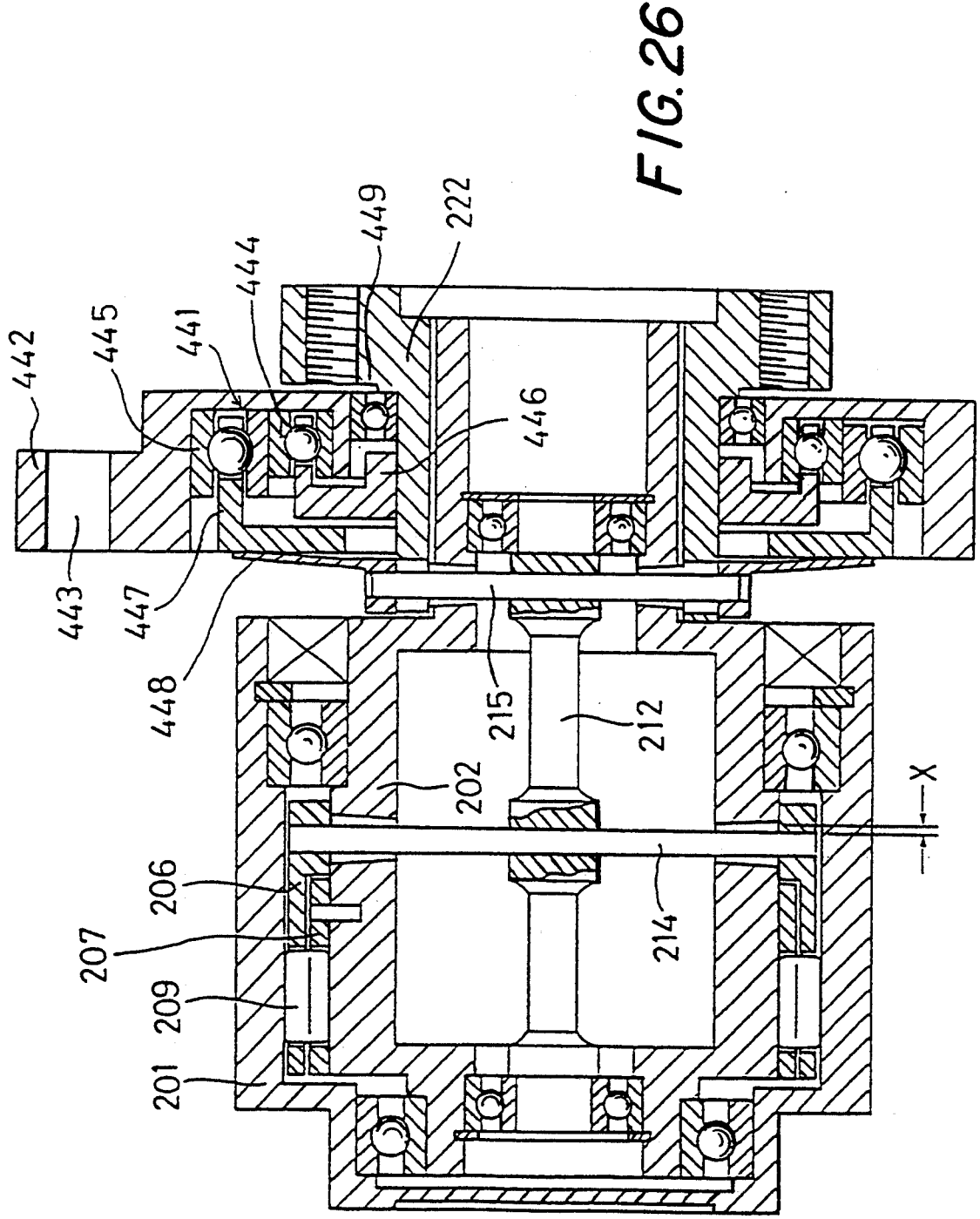
FIG. 26 is a vertical sectional front view of a 12th embodiment.
Figure 27:
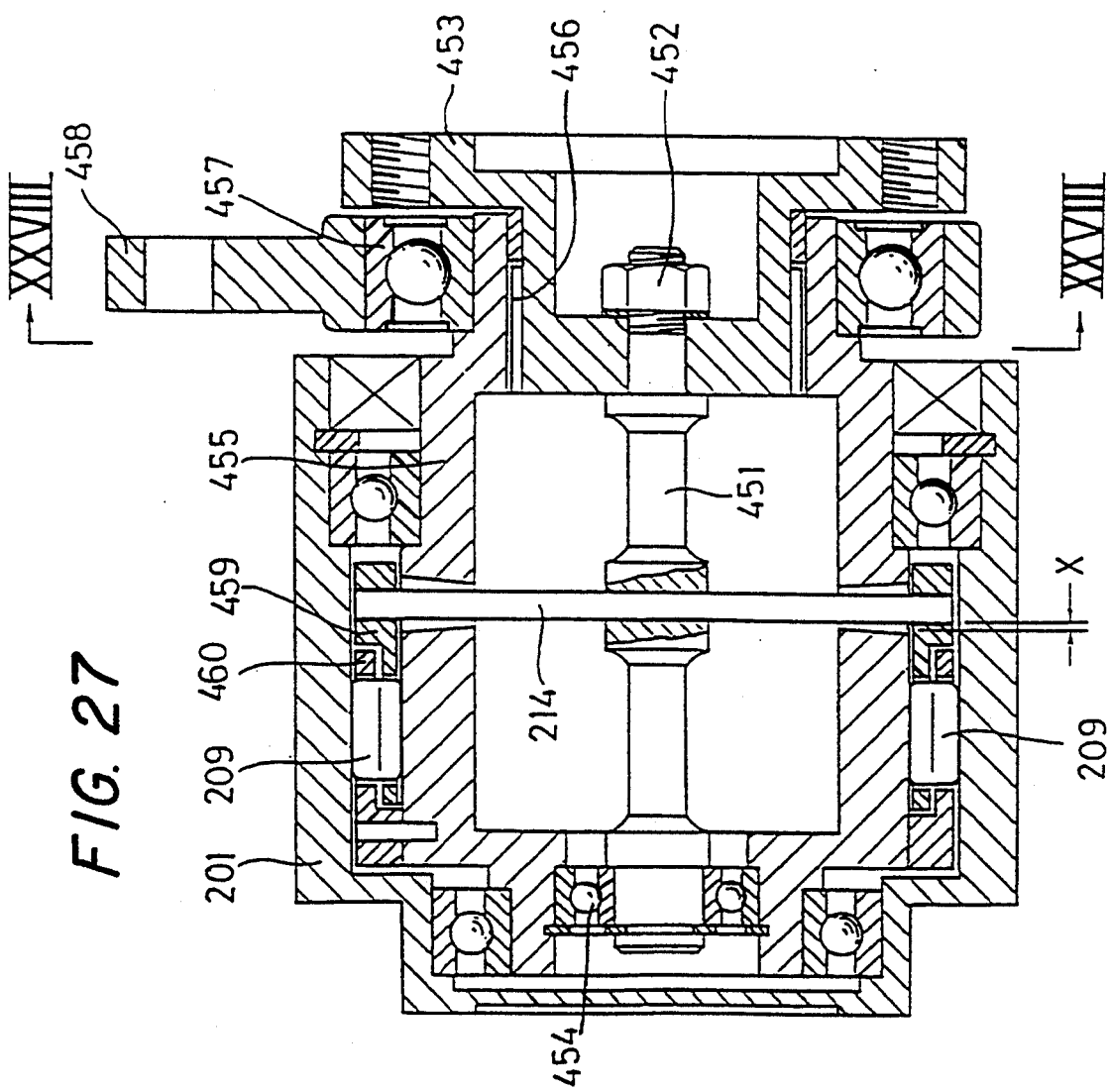
FIG. 27 is a vertical sectional front view of a 13th embodiment.

FIG. 25 shows the 11th embodiment. In this embodiment, a differential bearing 431 comprises two rolling bearings 432 and 433 having different raceway diameters. The bearings 432 and 433 are coupled together by integrally forming their cage 435 for their balls 434.

The small-diameter bearing 432 has its inner ring 432a secured to the input flange member 222, while the large-diameter bearing 433 has its inner ring 433a rotatable with respect to the flange member 222. A rotary member coupled to the coupling pin 215 is in sliding contact with the side of the inner ring 455a through an elastic member 436.

In the same manner as the 10th embodiment, each of the rolling bearings 432 and 433 has a radial gap set to equal to or smaller than zero and traction grease is sealed therein to prevent the balls 434 from slipping with respect to the cage 435.

In this arrangement, when the input flange member 222 rotates, its rotation is transmitted to the large-diameter bearing 433 through the cage 435. But the inner ring 433a of the large-diameter bearing 433 rotates slower than the inner ring 432a of the small-diameter bearing 432 due the difference in the raceway diameter. This delay in rotation is transmitted to the coupling pin 215 through the biasing force of the elastic member 436, thus slowing the revolving speed of the control shaft 212 with respect to the input shaft 202.

Twelfth Embodiment

Figure 28:
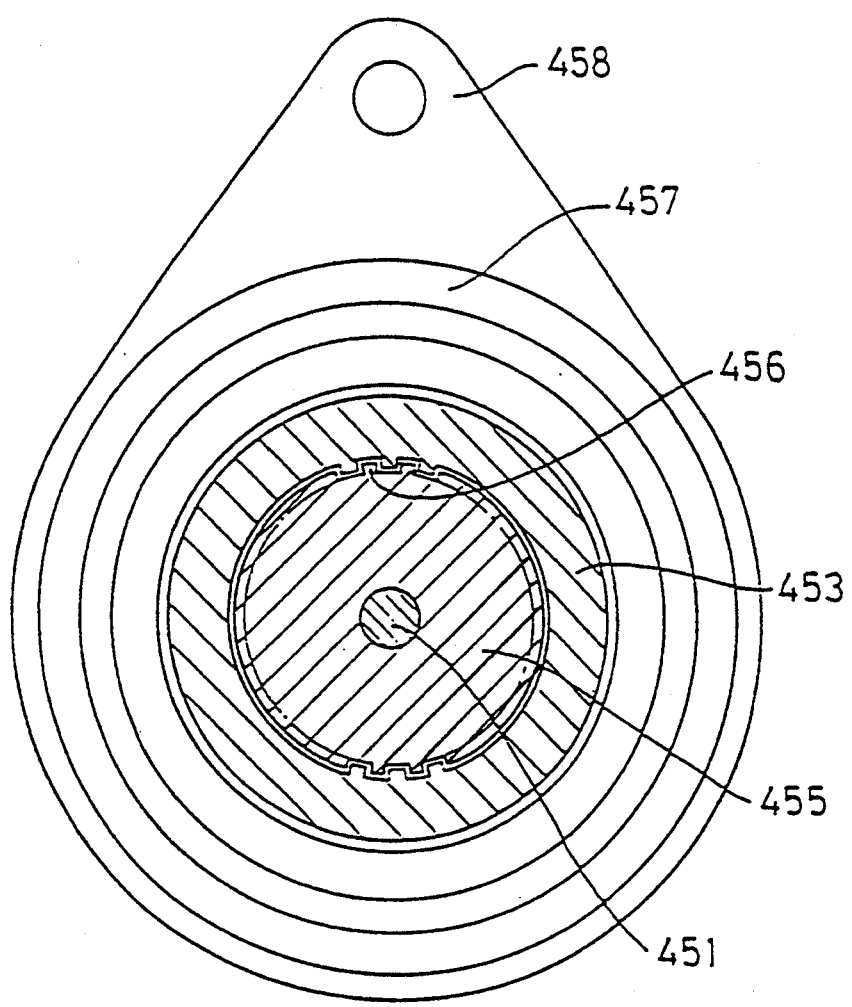
FIG. 28 is a sectional view taken along line XXVIII—XXVIII of FIG. 27.

FIG. 28 shows the 12th embodiment. In this embodiment, two rolling bearings 44 and 445 having different raceway diameters are mounted in a space 443 provided in a fixing arm 442, with their inner and outer ring coupled together in two layers.

The small-diameter bearing 444 has its cage 448 secured to the input flange member 222. A rotary member 448 coupled to the coupling pin 215 is in slide contact with a cage 447 of the large-diameter bearing 445. The rotary member 448 has a resilient force and is pressed against the cage 447, thereby reducing the difference in speed due to slipping with respect to the cage 447.

Numeral 449 designates a bearing for positioning the mixing arm 442 and the input flange member 222.

In the differential bearing 441 of the above-described structure, when the cage 446 of the small-diameter bearing 444 is turned by the input flange member 222, the rotation of the cage 447 of the large-diameter bearing 445 is retarded compared with the rotation of the cage 446 due to the difference in the raceway diameter. This delay in rotation is transmitted to the control shaft 212 through the rotary member 448 and the coupling pin 215.

In the 11th and 12th embodiments, the differential bearing may comprise three or more rolling bearings.

Thirteenth Embodiment

FIG. 28 shows the 13th embodiment. In this embodiment, a differential bearing is coupled to an input shaft side. Namely, a control shaft 451 has one end thereof secured to an input flange member 453 by threading a nut 452 and the other end rotatably supported on the input shaft 455 through a bearing 454.

The input flange member 453 and the input shaft 45 are coupled together through splines 456 having gaps in the direction of rotation. A differential bearing 457 is fitted on the outer peripheral surface of the input shaft 455. The differential bearing 457 has its outer ring forcibly fitted in a fixing arm 458 as in the eighth embodiment, so that it will have a larger resistance to rotation than the resistance at the supporting portion of the control shaft 451 due to preload. The resistance serves to decelerate the input shaft 455.

Further, a control cage 459, which is coupled to the central part of the control shaft 451 through the coupling pin 214, is located at the inner peripheral side of the sprags 209. A fixed cage 460, which is fixed to the input shaft 455, is located at the outer peripheral side of the sprags 209.

In this arrangement, when the input flange member 453 rotates, the control shaft 451 formates together with it. But tile rotation of the input shaft 455, which is decelerated by the differential bearing 457, retards by the amount corresponding to the gaps provided by the splines 456 in the direction of rotation. This causes the control cage 459 and the fixed cage 460 to rotate relative to each other. But since the control cage 459 is located at the inner peripheral side, tile sprags 209 will tilt in a direction opposite to the direction of rotation of the input shaft 455. Thus, the sprags 209 are put into engaging operative state.

In the sixth to 15th embodiments, sprags are used as engaging elements. But rollers may be used instead.

Fourteenth Embodiment

Figure 29:
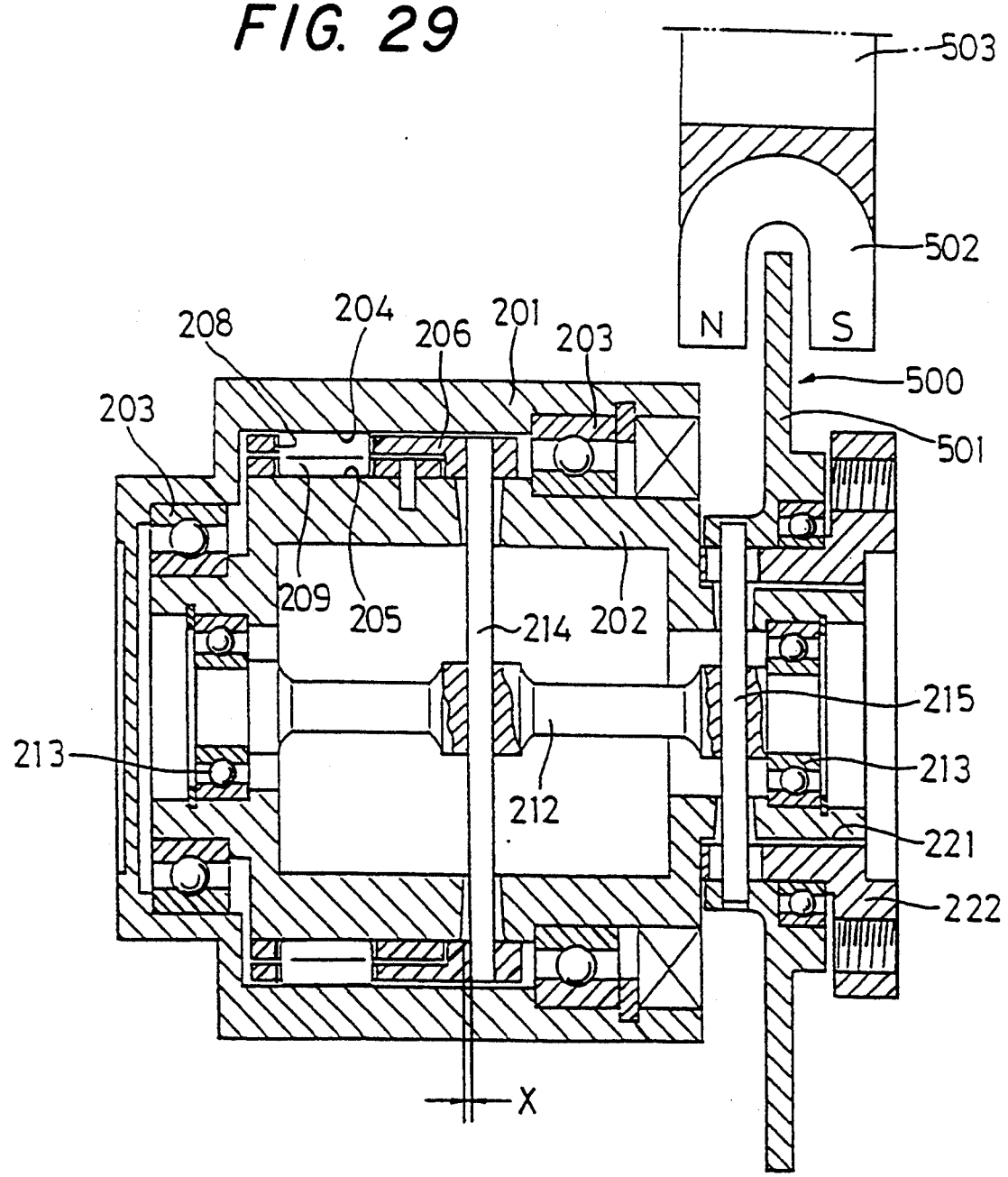
FIG. 29 is a vertical sectional front view of a 14th embodiment.

FIG. 29 shows the 14th embodiment.

The basic structure of the clutch portion of the 14th embodiment is similar to that of the sixth embodiment. But it differs in that a deceleration imparting means 500 as the differential means is coupled to the control shaft 212.

The deceleration imparting means 500 comprises a rotary member 501 secured to the coupling pin 215 and formed of a conductive material such as aluminum alloy, a U-shaped permanent magnet 502 enclosing the rotary member 501 in a non-contact manner, and a fixing arm 503 for supporting the permanent magnet 502 to an external fixing member. The permanent magnet 502 is formed with magnet poles at both ends thereof so as to face the end Face of the rotary member 501. The magnetic flux produced between the magnetic poles extends axially through the rotary member 501.

In this arrangement, when the rotary member 501 rotates across the magnetic flux produced by the permanent magnet 502, all overcurrent is produced on the surface of the rotary member 501 made of a conductive material, thus producing a force which tends to slow down the rotation of the rotary member 501. Thus, a braking force is applied to the control shaft 212 through the coupling pin 215, causing a delay in rotation of the input shaft 202. Since the rotary member 501 is decelerated in a non-contact manner, the rotary member can be decelerated suitably even if it is rotating at high speed. Further, since the rotary member 501 never gets worn, a stable durable life is assured.

In operation, when the input shaft 202 rotates in one direction, the rotation of the control shaft 212 retards since it is decelerated by the deceleration imparting means 500. Thus, the control cage 206 rotates relative to the input shaft 202 and the fixed cage 207 by the amount corresponding to the gaps X in the direction of rotation. By this relative rotation between the cages 206 and 207, the sprags 209 will tilt in a direction opposite to the direction of rotation of the input shaft 202, thus getting into engagement with the engaging surfaces 204 and 205. The device is now in an engaging operative state.

Fifteenth Embodiment

Figure 30:
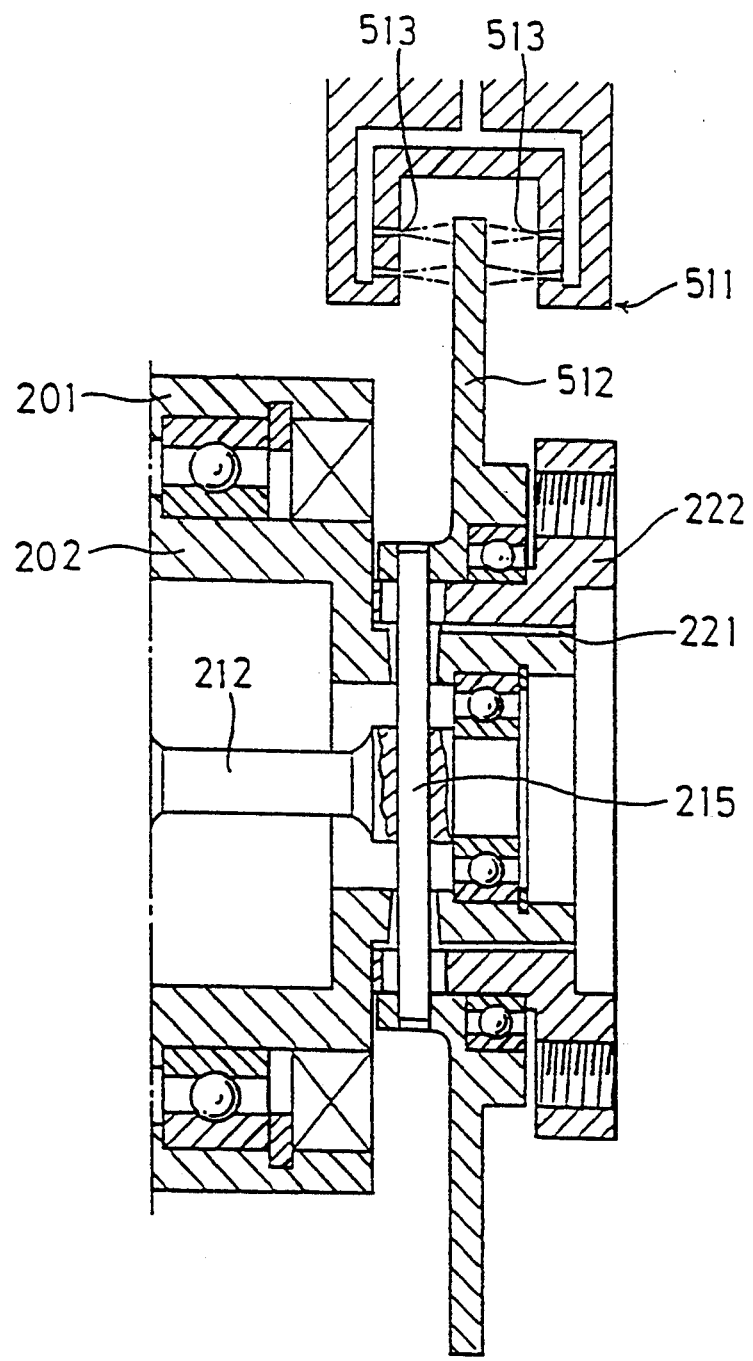
FIG. 30 is a vertical sectional from view of a 15th embodiment.

FIG. 30 shows the 15th embodiment. In this embodiment, a deceleration imparting means 511 comprises a rotary member 512 and nozzles 513 for blowing high-pressure fluid, provided opposite to both sides of the rotary member 512. By the pressure of the bloc-out fluid, the rotary member 512 is subjected to a couterforce in a direction opposite to its rotating direction. Thus, it can be decelerated in a non-contact manner.

Otherwise, this embodiment is the same in structure as the 14th embodiment. Like parts are denoted by like numerals and their description is omitted.

What is claimed is:

1. A torque transmission device comprising an outer ring, an input shaft rotatably mounted in said outer ring, said outer ring and said input shaft being formed with engaging surfaces so as to be opposite to each other, a cage rotatably mounted between said outer ring and said input shaft and formed with pockets, engaging elements mounted in said pockets and adapted to engage said engaging surfaces when said input shaft and said cage rotate relative to each other, elastic members mounted in said pockets to urge said engaging elements toward a position where they do not engage, a control shaft mounted coaxially with respect to said input shaft, said control shaft being integrally coupled with said cage, and input member integral with said control shaft and coupled with said input shaft with a gap left therebetween in the direction of rotation, and a rotation delay means for causing a relative rotation between said control shaft and said input shaft.

2. A torque transmission device as claimed in claim 1, further comprising a torque reversing transmission means provided between said control shaft and said cage for transmitting the rotation of said control shaft to said cage after reversing the direction of rotation.

3. A torque transmission device as claimed in claim 1 or 2, wherein said rotation delay means comprises a bearing having a resistance to rotation which is larger than a resistance to rotation applied to a portion at which one of said control shaft and said input shaft is supported.

4. A torque transmission device as claimed in claim 1 or 2, wherein said rotation delay means comprises a reduction gear unit for reducing the rotation of one of said control shaft and said input shaft and transmitting the reduced rotation to the other of them.

5. A torque transmission device as claimed in claim 1 or 2, wherein said rotation delay means comprises at least one rolling bearing having rolling elements and a cage for retaining said rolling elements and wherein its rotation is taken out from said cage.

6. A torque transmission device as claimed in claim 1 or 2, wherein said rotation delay means is kept out of contact with one of said control shaft and said input shaft.

7. A torque transmission device as claimed in claim 6, wherein said rotation delay means comprises a rotary member made of a conductive material and secured to one of said control shaft and said input shaft, and a magnet having both magnetic poles thereof arranged to enclose both ends of said rotary member.

* * * * *

UNITED STATES PATENT AND TRADEMARK OFFICE
CERTIFICATE OF CORRECTION

PATENT NO.   : 5,355,981
DATED        : October 18, 1994
INVENTOR(S)  : Kenichiro ITOH et al It is certified that error appears in the above-identified patent and that said Letters Patent is hereby corrected as shown below:

On the title page, Item [63], after "abandoned", insert --,filed as PCT/JP91/01704 on December 11, 1991

Signed and Sealed this

Twenty-fourth Day of January, 1995

Attest:

BRUCE LEHMAN

*Attesting Officer*     *Commissioner of Patents and Trademarks*